US012467797B2

(12) United States Patent
Dingman et al.

(10) Patent No.: US 12,467,797 B2
(45) Date of Patent: Nov. 11, 2025

(54) INTELLIGENT OVEN

(71) Applicant: TPS IP, LLC, Cleveland, OH (US)

(72) Inventors: Lyle Oscar Dingman, East Troy, WI (US); Michael Abraham Schneck, New Berlin, PA (US); Gary Allen Hanson, Janesville, WI (US); David Allen Strand, Burlington, WI (US); Michael Laddie Grande, Elkhorn, WI (US); Geoffry Allen Gromiuk, Mukwonago, WI (US); Steven Edward Kempowski, Oconomowoc, WI (US); Jon Allen Ludlum, Darien, WI (US)

(73) Assignee: TPS IP, LLC, Cleveland, OH (US)

( * ) Notice: Subject to any disclaimer, the term of this patent is extended or adjusted under 35 U.S.C. 154(b) by 228 days.

(21) Appl. No.: 18/158,917

(22) Filed: Jan. 24, 2023

(65) Prior Publication Data

US 2023/0160757 A1 May 25, 2023

Related U.S. Application Data

(62) Division of application No. 15/922,445, filed on Mar. 15, 2018, now Pat. No. 11,585,701.

(Continued)

(51) Int. Cl.
*G01K 3/00* (2006.01)
*F24C 7/08* (2006.01)

(52) U.S. Cl.
CPC .............. *G01K 3/005* (2013.01); *F24C 7/082* (2013.01); *G01K 2207/00* (2013.01)

(58) Field of Classification Search
CPC .......... F24C 7/087; F24C 15/322; F24C 7/08; F24C 15/325; F24C 15/2007;
(Continued)

(56) References Cited

U.S. PATENT DOCUMENTS 2,192,519 A 3/1940 King
2,836,498 A 5/1958 Fennema
(Continued)

FOREIGN PATENT DOCUMENTS

CN 201098013 Y 8/2008
CN 101986040 A 3/2011
(Continued)

OTHER PUBLICATIONS

Notice of Allowance received for U.S. Appl. No. 17/931,346 dated Dec. 6, 2023, 54 pages.
(Continued)

*Primary Examiner* — Vy T Nguyen
(74) *Attorney, Agent, or Firm* — Amin, Turocy & Watson, LLP

(57) ABSTRACT

Techniques for managing an intelligent oven are provided. In one example, an oven system can comprise a memory that stores computer executable components. The oven system can also comprise a processor, operably coupled to the memory, and that executes the computer executable components stored in the memory. The computer executable components can comprise an oven management component that identifies a parameter of a completed bake based on a second parameter of a new bake and shares the parameter with an input device.

10 Claims, 10 Drawing Sheets

Related U.S. Application Data

(60) Provisional application No. 62/577,937, filed on Oct. 27, 2017.

(58) Field of Classification Search
CPC .......... F24C 15/327; F24C 7/06; F24C 7/082;
F24C 15/16; F24C 15/08; F24C 15/006;
F24C 14/02; F24C 15/106; F24C 3/027;
F24C 7/00; F24C 7/085; F24C 15/2042;
F24C 15/2014; F24C 3/126; F24C
15/022; F24C 15/32; F24C 15/18; F24C
15/105; F24C 3/128; F24C 15/00; F24C
7/083; F24C 15/02; F24C 3/087; F24C
7/065; F24C 15/04; F24C 15/005; F24C
15/102; F24C 15/34; F24C 14/005; F24C
15/30; F24C 3/124; F24C 7/046; F24C
14/00; F24C 14/025; F24C 7/043; F24C
13/00; F24C 15/007; F24C 3/085; F24C
15/162; F24C 15/008; F24C 15/101;
F24C 15/14; F24C 15/10; F24C 7/10;
F24C 15/22; F24C 15/164; F24C 3/12;
F24C 15/001; F24C 1/04; F24C 3/008;
F24C 15/003; F24C 7/006; F24C 7/081;
F24C 7/086; F24C 7/088; F24C 15/12;
F24C 15/027; F24C 15/2021; F24C
15/166; F24C 15/021; F24C 7/02; F24C
15/023; F24C 3/122; F24C 11/00; F24C
3/047; F24C 7/04; F24C 5/02; F24C
7/067; F24C 3/14; F24C 15/20; F24C
5/06; F24C 1/02; F24C 3/103; F24C
15/2035; F24C 9/00; F24C 1/14; F24C
15/024; F24C 15/025; F24C 7/105; F24C
1/16; F24C 7/062; F24C 15/103; F24C
15/205; F24C 7/002; F24C 3/067; F24C
3/08; F24C 15/026; F24C 15/2092; F24C
7/004; F24C 15/004; F24C 1/00; F24C
15/108; F24C 15/2028; F24C 15/36;
F24C 1/06; F24C 15/168; F24C 15/002;
F24C 3/004; F24C 7/008; F24C 1/08;
F24C 15/045; F24C 15/107; F24C
15/2085; F24C 5/16; F24C 15/28; F24C
3/00; F24C 3/042; F24C 3/002; F24C
3/025; F24C 3/10; F24C 5/20; A23L
5/15; A23L 5/13; A23L 15/00; A23L
15/20; A23L 5/11; A23L 5/17; A23L
19/18; A23L 5/10; A23L 15/30; A23L
19/09; A23L 7/187; A23L 7/196; A23L
7/117; A23L 7/13; A23L 7/109; A23L
19/03; A23L 13/00; A23L 2/02; A23L
2/52; A23L 7/1975; A23L 19/19; A23L
15/10; A23L 7/183; A23L 5/32; A23L
13/03; A23L 7/198; A23L 23/00; A23L
33/105; A23L 15/35; A23L 27/60; A23L
2/04; A23L 13/65; A23L 13/67; A23L
33/40; A23L 19/15; A23L 13/76; A23L
5/00; A23L 5/34; A23L 13/428; A23L
5/30; A23L 11/07; A23L 5/42; A23L
33/16; A23L 5/12; A23L 7/165; A23L
11/65; A23L 29/212; A23L 7/17; A23L
2/66; A23L 5/19; A23L 5/21; A23L
7/111; A23L 13/72; A23L 5/23; A23L
13/60; A23L 17/00; A23L 19/01; A23L
19/14; A23L 7/10; A23L 7/126; A23L
15/25; A23L 2/38; A23L 25/20; A23L
33/15; A23L 7/122; A23L 7/135; A23L
11/45; A23L 17/40; A23L 17/70; A23L
35/00; A23L 7/197; A23L 33/17; A23L
11/31; A23L 25/30; A23L 33/10; A23L
13/06; A23L 19/13; A23L 29/30; A23L
13/57; A23L 2/54; A23L 2/56; A23L
31/00; A23L 5/55; A23L 7/115; A23L
33/21; A23L 33/115; A23L 13/75; A23L
17/75; A23L 19/00; A23L 29/256; A23L
5/57; A23L 13/77; A23L 13/52; A23L
19/12; A23L 27/00; A23L 7/191; A23L
23/10; A23L 25/10; A23L 33/12; A23L
33/155; A23L 7/178; A23L 9/12; A23L
29/284; A23L 33/185; A23L 7/152; A23L
11/05; A23L 19/20; A23L 33/19; A23L
33/30; A23L 7/148; A23L 13/50; A23L
2/00; A23L 2/06; A23L 2/08; A23L
27/14; A23L 27/27; A23L 9/10; A23L
13/55; A23L 2/10; A23L 5/20; A23L
5/273; A23L 13/42; A23L 13/62; A23L
19/105; A23L 2/385; A23L 2/74; A23L
33/22; A23L 13/424; A23L 13/426; A23L
13/70; A23L 2/60; A23L 21/12; A23L
29/10; A23L 7/11; A23L 7/139; A23L
11/03; A23L 2/39; A23L 29/219; A23L
29/231; A23L 33/175; A23L 33/18; A23L
7/1965; A23L 27/215; A23L 33/20; A23L
19/10; A23L 25/25; A23L 27/40; A23L
5/25; A23L 5/43; A23L 7/143; A23L
11/36; A23L 19/05; A23L 27/10; A23L
27/66; A23L 27/70; A23L 7/157; A23L
13/20; A23L 33/00; A23L 5/27; A23L
5/36; A23L 5/47; A23L 19/11; A23L
2/70; A23L 2/76; A23L 27/26; A23L
27/63; A23L 27/72; A23L 17/60; A23L
27/50; A23L 33/11; A23L 33/135; A23L
7/174; A23L 2/72; A23L 25/00; A23L
29/20; A23L 29/281; A23L 35/10; A23L
19/07; A23L 2/68; A23L 27/11; A23L
29/065; A23L 29/238; A23L 29/262;
A23L 7/00; A23L 11/50; A23L 13/422;
A23L 17/65; A23L 29/206; A23L 29/244;
A23L 29/27; A23L 29/35; A23L 7/101;
A23L 7/107; A23L 11/35; A23L 13/10;
A23L 17/50; A23L 5/40; A23L 5/48;
A23L 7/113; A23L 7/20; A23L 11/01;
A23L 13/43; A23L 2/087; A23L 2/14;
A23L 2/40; A23L 27/16; A23L 27/2052;
A23L 33/13; A23L 7/161; A23L 7/1963;
A23L 9/22; A23L 2/58; A23L 21/10;
A23L 27/30; A23L 33/125; A23L 5/276;
A23L 5/44; A23L 5/49; A23L 9/20; A23L
11/34; A23L 13/48; A23L 17/30; A23L
2/395; A23L 21/15; A23L 27/34; A23L
27/79; A23L 33/24; A23L 5/51; A23L
7/104; A23L 9/24; A23L 11/10; A23L
11/70; A23L 13/30; A23L 2/082; A23L
2/84; A23L 21/18; A23L 21/25; A23L
27/115; A23L 27/13; A23L 27/20; A23L
27/28; A23L 27/31; A23L 27/36; A23L
27/84; A23L 27/88; A23L 29/06; A23L
29/225; A23L 29/269; A23L 33/14; A23L
33/165; A23L 5/41; A23L 7/25; A23L
11/00; A23L 17/10; A23L 17/35; A23L
2/12; A23L 2/64; A23L 21/00; A23L
27/12; A23L 27/201; A23L 27/33; A23L
27/45; A23L 29/015; A23L 29/272; A23L 29/37; A23L 33/26; A23L 33/28; A23L 9/00; A47J 27/004; A47J 37/044; A47J 27/04; A47J 37/0814; A47J 37/0611; A47J 37/0623; A47J 37/08; A47J 39/006; A47J 37/0704; A47J 27/16; A47J 37/1266; A47J 27/14; A47J 37/1214; A47J 27/62; A47J 37/0857; A47J 37/0629; A47J 36/2483; A47J 27/18; A47J 37/041; A47J 36/32; A47J 37/0786; A47J 37/047; A47J 37/0641; A47J 37/06; A47J 36/165; A47J 36/027; A47J 27/10; A47J 39/003; A47J 37/00; A47J 37/045; A47J 37/0713; A47J 37/1228; A47J 37/043; A47J 37/067; A47J 43/046; A47J 37/0821; A47J 36/321; A47J 29/04; A47J 37/1219; A47J 27/0817; A47J 37/0676; A47J 37/0763; A47J 37/046; A47J 37/042; A47J 37/0635; A47J 37/0807; A47J 43/044; A47J 2027/006; A47J 31/4485; A47J 2027/043; A47J 31/52; A47J 36/38; A47J 37/0842; A47J 27/0802; A47J 37/1223; A47J 37/049; A47J 37/0688; A47J 27/002; A47J 37/015; A47J 37/04; A47J 37/10; A47J 39/02; A47J 36/06; A47J 29/02; A47J 37/1209; A47J 39/00; A47J 43/0716; A47J 37/085; A47J 37/1271; A47J 2202/00; A47J 36/24; A47J 37/0682; A47J 37/0694; A47J 36/00; A47J 36/02; A47J 37/108; A47J 43/18; A47J 2037/0617; A47J 45/068; A47J 31/56; A47J 37/0664; A47J 27/09; A47J 37/0709; A47J 37/0871; A47J 41/005; A47J 37/01; A47J 47/14; A47J 37/1295; A47J 47/145; A47J 27/0813; A47J 43/145; A47J 31/002; A47J 37/106; A47J 36/022; A47J 37/0745; A47J 29/00; A47J 37/0718; A47J 37/105; A47J 27/212; A47J 36/20; A47J 36/2433; A47J 37/0754; A47J 44/00; A47J 2027/008; A47J 31/525; A47J 43/0722; A47J 37/048; A47J 37/07; A47J 27/00; A47J 31/4489; A47J 37/12; A47J 36/04; A47J 43/04; A47J 43/0727; A47J 31/42; A47J 31/44; A47J 31/5253; A47J 36/26; A47J 37/1247; A47J 27/08; A47J 27/086; A47J 36/36; A47J 36/16; A47J 36/2405; A47J 36/2494; A47J 27/092; A47J 43/085; A47J 37/128; A47J 36/34; A47J 43/082; A47J 43/20; A47J 43/07; A47J 37/0658; A47J 31/4403; A47J 47/10; A47J 31/46; A47J 31/545; A47J 37/0878; A47J 31/60; A47J 37/1233; A47J 31/40; A47J 31/401; A47J 2037/0795; A47J 31/4492; A47J 36/2488; A47J 37/0864; A47J 31/58; A47J 37/1276; A47J 37/0892; A47J 37/1242; A47J 43/24; A47J 37/1285; A47J 37/129; A47J 27/022; A47J 37/0647; A47J 43/042; A47J 31/407; A47J 37/0835; A47J 41/0044; A47J 27/05; A47J 27/17; A47J 31/521; A47J 31/54; A47J 37/1257; A47J 43/0465; A47J 27/20; A47J 31/5255; A47J 33/00; A47J 43/0705; A47J 27/0804; A47J 27/21083; A47J 36/2438; A47J 37/103; A47J 37/1238; A47J 31/402; A47J 31/053; A47J 43/283; A47J 29/06; A47J 36/064; A47J 43/06; A47J 2043/04481; A47J 27/12; A47J 31/404; A47J 37/0731; A47J 37/0828; A47J 37/1261; A47J 31/4496; A47J 31/469; A47J 47/01; A47J 27/088; A47J 27/21091; A47J 36/025; A47J 37/0652; A47J 43/0711; A47J 43/0772; A47J 43/0777; A47J 43/28; A47J 31/00; A47J 39/025; A47J 43/16; A47J 19/02; A47J 19/027; A47J 2043/04454; A47J 27/0806; A47J 27/2105; A47J 31/36; A47J 31/5251; A47J 2203/00; A47J 31/4482; A47J 36/10; A47J 36/2472; A47J 2043/0733; A47J 31/005; A47J 31/41; A47J 37/079; A47J 27/21041; A47J 31/461; A47J 36/2466; A47J 36/28; A47J 27/13; A47J 27/56; A47J 31/02; A47J 31/057; A47J 31/20; A47J 31/4457; A47J 36/12; A47J 36/2411; A47J 36/2411; A47J 37/0781; A47J 43/14; A47J 2037/0777; A47J 27/21058; A47J 36/14; A47J 37/1204; A47J 2043/0449; A47J 2043/0738; A47J 31/007; A47J 31/3609; A47J 31/542; A47J 36/2477; A47J 43/27; A47J 45/06; A47J 45/061; A47J 31/4407; A47J 37/0885; A47J 31/3671; A47J 31/50; A47J 36/2461; A47J 37/0727; A47J 37/101; A47J 42/52; A47J 45/063; A47J 47/12; A47J 2201/00; A47J 31/4417; A47J 31/465; A47J 31/467; A47J 37/1252; A47J 43/288; A47J 45/10; A47J 27/026; A47J 31/3623; A47J 36/2416; A47J 43/1093; A47J 43/26; A47J 47/005; A47J 47/16; A47J 19/023; A47J 27/0808; A47J 27/21166; A47J 31/0663; A47J 31/468; A47J 41/0094; A47J 42/38; A47J 43/0766; A47J 43/087; A47J 27/0811; A47J 27/21108; A47J 31/047; A47J 31/0573; A47J 31/0621; A47J 31/24; A47J 31/3614; A47J 31/4425; A47J 31/462; A47J 36/066; A47J 37/0605; A47J 43/10; A47J 43/282; A47J 44/02; A47J 47/02; A47J 2043/04436; A47J 27/024; A47J 27/06; A47J 27/21075; A47J 31/405; A47J 36/08; A47J 37/0722; A47J 37/074; A47J 43/12; A47J 43/287; A47J 45/071; A47J 27/21016; A47J 27/21066; A47J 27/21116; A47J 27/21133; A47J 27/58; A47J 31/30; A47J 31/446; A47J 37/0772; A47J 43/0788; A47J 45/02; A47J 45/07; A47J 45/074; A47J 27/21008; A47J 31/0576; A47J 31/06; A47J 31/32; A47J 31/3619; A47J 31/4432; A47J 31/605; A47J 36/22; A47J 37/0768; A47J 42/50; A47J 43/0755; A47J 47/04; A47J 9/005; A47J 2043/04445; A47J 2043/0744; A47J 27/21; A47J 27/21125; A47J 27/21158; A47J 31/0605; A47J 31/08; A47J 31/18; A47J 31/3633; A47J 31/368; A47J 31/3685; A47J 31/369; A47J 36/18; A47J 37/0736; A47J 37/0759; A47J 42/40; A47J 43/0761; A47J 43/0794; A47J 47/06; A47J 27/02; A47J 27/0815; A47J 27/2115; A47J 27/21175; A47J 27/21191; A47J 31/0668; A47J 31/3642; A47J 31/3676; A47J 36/30; A47J 41/0005; A47J 42/44; A47J 43/08; A47J 43/281; A47J 17/14; A47J 17/16; A47J 17/18; A47J 19/04; A47J 19/06; A47J 2043/04472; A47J 27/082; A47J 27/21141; A47J 27/57; A47J 31/0615; A47J 31/0642; A47J 31/10; A47J 31/106; A47J 31/4439; A47J 31/547; A47J 37/075; A47J 41/0038; A47J 41/0077; A47J 41/024; A47J 42/48; A47J 43/00; A47J 43/005; A47J 43/105; A47J 43/125; A47J 43/126; A47J 43/25; A47J 45/062; A47J 45/066; A47J 47/00; A47J 9/001

USPC ......... 99/443 C, 325, 331, 333, 443 R, 386, 99/328, 337, 338, 341, 342, 344, 360, 99/389, 451, 468, 326, 327, 329 P, 99/329 RT, 330, 334, 336, 348, 388, 395, 99/447, 453, 470, 472, 473, 474, 476, 99/477, 483, 486, 516; 219/492, 388, 219/411, 413, 412, 494, 497, 386, 387, 219/405, 445.1, 483, 508, 606, 400, 486, 219/509; 26/21 A; 126/19 R, 21 R, 20, 126/273 R, 41 C; 426/523, 298, 521, 426/614, 231, 233, 242, 243, 248, 300, 426/383, 393, 466, 665; 392/418, 420, 392/422; 700/239, 90

See application file for complete search history.

(56) References Cited

U.S. PATENT DOCUMENTS

| | | | |
|---|---|---|---|
| 3,127,889 | A | 4/1964 | Mills |
| 4,262,026 | A | 4/1981 | Korkmaz |
| 4,274,688 | A | 6/1981 | Zacky |
| RE31,529 | E | 3/1984 | Lowe |
| 4,509,553 | A | 4/1985 | Hahn |
| 4,512,362 | A | 4/1985 | Groeschner |
| 4,701,334 | A | 10/1987 | Durth |
| 4,708,069 | A | 11/1987 | Kidd |
| 4,712,578 | A | 12/1987 | White |
| 4,726,352 | A | 2/1988 | Radke |
| 4,726,399 | A | 2/1988 | Miller |
| 4,830,054 | A | 5/1989 | Feichtiger et al. |
| 4,913,189 | A | 4/1990 | Kline et al. |
| 5,107,897 | A | 4/1992 | Stoll |
| 5,121,513 | A | 6/1992 | Thomas et al. |
| 5,235,903 | A | 8/1993 | Tippmann |
| 5,355,868 | A | 10/1994 | Haen |
| 5,417,246 | A | 5/1995 | Perkins et al. |
| 5,657,786 | A | 8/1997 | DuRoss et al. |
| 5,927,337 | A | 7/1999 | LaMantia |
| 5,993,878 | A | 11/1999 | Tippmann |
| 6,247,773 | B1 | 6/2001 | Harigai et al. |
| 6,578,600 | B1 | 6/2003 | Young, Jr. |
| 6,713,741 | B2 | 3/2004 | Miller |
| 6,766,830 | B2 | 7/2004 | Rondreux et al. |
| 7,191,800 | B2 | 3/2007 | Berner et al. |
| 7,484,527 | B2 | 2/2009 | Tamaki et al. |
| 8,047,198 | B2 | 11/2011 | Meyer et al. |
| 8,082,943 | B2 | 12/2011 | Berner et al. |
| 8,172,546 | B2 | 5/2012 | Cedrone et al. |
| 8,753,097 | B2 | 6/2014 | Cedrone et al. |
| 8,807,164 | B2 | 8/2014 | Baier et al. |
| 9,732,876 | B2 | 8/2017 | Johnson |
| 9,921,641 | B1 | 3/2018 | Worley, III et al. |
| 10,008,037 | B1 | 6/2018 | Worley, III et al. |
| 10,495,374 | B1 | 12/2019 | Hall et al. |
| 10,504,384 | B1 | 12/2019 | Drake |
| 2002/0088244 | A1 | 7/2002 | Jennings et al. |
| 2002/0088800 | A1 | 7/2002 | Miller |
| 2002/0095269 | A1 | 7/2002 | Natalini et al. |
| 2003/0061773 | A1 | 4/2003 | O'Leary |
| 2004/0086606 | A1 | 5/2004 | Roehr et al. |
| 2004/0123857 | A1 | 7/2004 | Viraldo |
| 2006/0289530 | A1 | 12/2006 | Cordae |
| 2007/0095413 | A1 | 5/2007 | Zhu et al. |
| 2007/0267402 | A1 | 11/2007 | Harned et al. |
| 2008/0149088 | A1 | 6/2008 | Inada et al. |
| 2008/0206420 | A1 | 8/2008 | McFadden |
| 2009/0090347 | A1 | 4/2009 | Kim et al. |
| 2009/0194090 | A1 | 8/2009 | Kim et al. |
| 2009/0236333 | A1 | 9/2009 | Ben-Shmuel et al. |
| 2010/0128755 | A1 | 5/2010 | Luckhardt et al. |
| 2010/0242370 | A1 | 9/2010 | Trulaske, Sr. |
| 2010/0296996 | A1 | 11/2010 | Ohta et al. |
| 2011/0036826 | A1 | 2/2011 | Feng et al. |
| 2011/0050872 | A1 | 3/2011 | Harbert et al. |
| 2011/0054967 | A1 | 3/2011 | Han et al. |
| 2011/0151076 | A1 | 6/2011 | Zapp Glauser |
| 2011/0266271 | A1 | 11/2011 | Boyer et al. |
| 2011/0283714 | A1 | 11/2011 | Veltrop |
| 2011/0318698 | A1 | 12/2011 | Gaur et al. |
| 2013/0092032 | A1 | 4/2013 | Cafferty et al. |
| 2014/0026762 | A1 | 1/2014 | Riefenstein |
| 2014/0097172 | A1 | 4/2014 | Kang et al. |
| 2014/0203012 | A1 | 7/2014 | Corona et al. |
| 2015/0019017 | A1 | 1/2015 | Bodine et al. |
| 2015/0118632 | A1 | 4/2015 | Liu |
| 2015/0182074 | A1 | 7/2015 | Bucher et al. |
| 2015/0201803 | A1 | 7/2015 | Veltrop |
| 2015/0234829 | A1 | 8/2015 | Yoshitake et al. |
| 2016/0140728 | A1 | 5/2016 | Aonuma et al. |
| 2016/0160880 | A1 | 6/2016 | Douglas et al. |
| 2016/0187001 | A1 | 6/2016 | Bombardieri et al. |
| 2016/0327281 | A1 | 11/2016 | Bhogal et al. |
| 2016/0345167 | A1 | 11/2016 | Li et al. |
| 2016/0356388 | A1 | 12/2016 | Inoue |
| 2016/0359325 | A1* | 12/2016 | Kawata ............... H04L 12/2829 |
| 2016/0374501 | A1 | 12/2016 | Logan et al. |
| 2017/0205108 | A1 | 7/2017 | Petrovic et al. |
| 2017/0208652 | A1 | 7/2017 | Luckhardt et al. |
| 2017/0224149 | A1* | 8/2017 | Koennings ......... G05B 19/41815 |
| 2017/0243515 | A1 | 8/2017 | Vengroff et al. |
| 2018/0032125 | A1 | 2/2018 | Peterson et al. |
| 2018/0062691 | A1 | 3/2018 | Barnett, Jr. |
| 2018/0073255 | A1 | 3/2018 | Jeffries |
| 2018/0100656 | A1 | 4/2018 | Deshpande |
| 2018/0101608 | A1 | 4/2018 | Thysell |
| 2018/0114372 | A1 | 4/2018 | Nagy et al. |
| 2018/0163971 | A1 | 6/2018 | Mizusaki et al. |
| 2018/0181094 | A1 | 6/2018 | Funk et al. |
| 2018/0220500 | A1 | 8/2018 | Staton et al. |
| 2018/0345485 | A1 | 12/2018 | Sinnet et al. |
| 2019/0053332 | A1 | 2/2019 | Cheng et al. |
| 2019/0062084 | A1 | 2/2019 | Delieutraz et al. |
| 2019/0066239 | A1 | 2/2019 | Touchette et al. |
| 2019/0121522 | A1 | 4/2019 | Davis et al. |
| 2019/0159300 | A1 | 5/2019 | Khizar et al. |
| 2019/0295330 | A1 | 9/2019 | Nagy et al. |
| 2019/0374059 | A1 | 12/2019 | Samonigg et al. |
| 2020/0005669 | A1 | 1/2020 | Thysell |

FOREIGN PATENT DOCUMENTS

| | | |
|---|---|---|
| CN | 202348357 U | 7/2012 |
| CN | 102893091 A | 1/2013 |
| CN | 202810961 U | 3/2013 |
| CN | 103148472 A | 6/2013 |
| DE | 10 2006 029 902 A1 | 1/2008 |
| GB | 996233 A | 10/1963 |
| WO | 2013/171181 A1 | 11/2013 |
| WO | 2021/095395 A1 | 5/2021 |

OTHER PUBLICATIONS

Notice of Allowance received for U.S. Appl. No. 17/931,328 dated Nov. 29, 2023, 62 pages.

(56) References Cited

OTHER PUBLICATIONS

Non-Final Office Action received for U.S. Appl. No. 17/658,543 dated Feb. 1, 2024, 107 pages.
Non-Final Office Action received for U.S. Appl. No. 17/931,346 dated Mar. 2, 2023, 72 pages.
Non-Final Office Action received for U.S. Appl. No. 17/931,328 dated Feb. 17, 2023, 63 pages.
Final Office Action received for U.S. Appl. No. 17/931,346 dated Sep. 21, 2023, 89 pages.
Final Office Action received for U.S. Appl. No. 17/931,328 dated Sep. 8, 2023, 83 pages.
Notice of Allowance received for U.S. Appl. No. 17/931,328 dated Mar. 13, 2024, 6 pages.
Notice of Allowance received for U.S. Appl. No. 17/931,346 dated Mar. 6, 2024, 6 pages.
Non-Final Office Action received for U.S. Appl. No. 17/658,550 dated Mar. 14, 2024, 159 pages.
Notice of Allowance received for U.S. Appl. No. 17/677,632 dated Mar. 4, 2024, 105 pages.
Final Office Action received for U.S. Appl. No. 17/658,543 dated Jun. 21, 2024, 118 pages.
Notice of Allowance received for U.S. Appl. No. 17/658,543 dated Sep. 13, 2024, 156 pages.
Notice of Allowance received for U.S. Appl. No. 17/658,550 dated Aug. 21, 2024, 166 pages.
Notice of Allowance received for U.S. Appl. No. 17/677,632 dated May 20, 2024, 7 pages.
Notice of Allowance received for U.S. Appl. No. 17/658,543 dated Sep. 27, 2024, 6 pages.
Notice of Allowance received for U.S. Appl. No. 17/658,550 dated Oct. 1, 2024, 6 pages.
Notice of Allowance received for U.S. Appl. No. 17/677,652 dated Oct. 7, 2024, 99 pages.
Non-Final Office Action received for U.S. Appl. No. 15/922,623 dated Jul. 25, 2019, 31 pages.
Final Office Action received for U.S. Appl. No. 15/922,623 dated Dec. 16, 2019, 24 pages.
Non-Final Office Action received for U.S. Appl. No. 15/922,584 dated Mar. 2, 2020, 43 pages.
Non-Final Office Action received for U.S. Appl. No. 15/922,605 dated Apr. 3, 2020, 53 pages.
Non-Final Office Action received for U.S. Appl. No. 15/922,445 dated May 29, 2020, 45 pages.
Non-Final Office Action received for U.S. Appl. No. 15/922,569 dated Jun. 8, 2020, 36 pages.
Final Office Action received for U.S. Appl. No. 15/922,519 dated Jun. 8, 2020, 37 pages.
Notice of Allowance received for U.S. Appl. No. 15/922,584 dated Jun. 10, 2020, 50 pages.
Final Office Action received for U.S. Appl. No. 15/922,445 dated Dec. 11, 2020, 45 pages.
Final Office Action received for U.S. Appl. No. 15/922,605 dated Oct. 26, 2020, 24 pages.
Final Office Action received for U.S. Appl. No. 15/922,519 dated Nov. 30, 2020, 33 pages.
Final Office Action received for U.S. Appl. No. 15/922,569 dated Oct. 6, 2020, 34 pages.
Advisory Office Action received for U.S. Appl. No. 15/922,605 dated Jan. 25, 2021, 16 pages.
Non-Final Office Action received for U.S. Appl. No. 15/922,605 dated Feb. 19, 2021, 31 pages.
Advisory Office Action received for U.S. Appl. No. 15/922,519 dated Feb. 19, 2021, 12 pages.
Non-Final Office Action received for U.S. Appl. No. 15/922,445 dated Aug. 19, 2021, 49 pages.
Final Office Action received for U.S. Appl. No. 15/922,605 dated Aug. 18, 2021, 35 pages.
Non-Final Office Action received for U.S. Appl. No. 15/922,519 dated Aug. 6, 2021, 49 pages.
Non-Final Office Action received for U.S. Appl. No. 15/922,569 dated Jul. 23, 2021, 54 pages.
Non-Final Office Action received for U.S. Appl. No. 15/922,605 dated Jan. 13, 2022, 42 pages.
Notice of Allowance received for U.S. Appl. No. 15/922,519 dated Jan. 10, 2022, 57 pages.
Notice of Allowance received for U.S. Appl. No. 15/922,569 dated Dec. 1, 2021, 51 pages.
Advisory Office Action received for U.S. Appl. No. 15/922,605 dated Dec. 20, 2021, 22 pages.
Final Office Action received for U.S. Appl. No. 15/922,445 dated Mar. 15, 2022, 51 pages.
Advisory Action received for U.S. Appl. No. 15/922,445 dated Jun. 10, 2022, 29 pages.
Non-Final Office Action received for U.S. Appl. No. 15/922,445 dated Jun. 23, 2022, 37 pages.
Notice of Allowance received for U.S. Appl. No. 15/922,445 dated Oct. 18, 2022, 48 pages.
Notice of Allowance received for U.S. Appl. No. 15/922,605 dated Oct. 13, 2022, 6 pages.
Non-Final Office Action received for U.S. Appl. No. 18/158,907 dated Apr. 9, 2025, 17 pages.
Non-Final Office Action received for U.S. Appl. No. 18/158,912 dated Apr. 23, 2025, 15 pages.
Notice of Allowance received for U.S. Appl. No. 18/158,912 dated Sep. 3, 2025, 12 pages.

\* cited by examiner

INTELLIGENT OVEN

CROSS-REFERENCE TO RELATED APPLICATIONS

The present application is a divisional application, and claims priority, to U.S. Non-Provisional patent application Ser. No. 15/922,445 filed on Mar. 15, 2018, entitled "INTELLIGENT OVEN," which claims priority to U.S. Provisional Patent Application Ser. No. 62/577,937 filed on Oct. 27, 2017, entitled "INTELLIGENT OVEN." The entireties of the aforementioned applications are incorporated by reference herein.

TECHNICAL FIELD

The subject disclosure relates to an intelligent oven, and more specifically, to oven with one or more systems and/or computer programs to increase functionality and automation.

BACKGROUND ART

Conventional ovens are manufactured in a variety of sizes and can be configured in accordance with a multitude of settings. The quality of products produced by an oven can depend on the multitude of settings and the item being baked. Oven settings are conventionally configured by an operator based on the item being baked, a desired product quality, and/or the operator's personal knowledge and experience with regard to the oven and/or the item. Additionally, conventional ovens rely on an operator's expertise to: assembly and/or configure the oven, identify maintenance issues and perform maintenance procedures, and/or ensure that the oven's operating conditions are compliant with one or more warranties.

In various embodiments described herein, apparatuses, systems, computer implemented methods, procedures, and/or computer program products are provide to facilitate the automatic and/or autonomous management of one or more ovens. For example, one or more embodiments described herein can facilitate a sharing of information regarding previous bakes conducted by a plurality of ovens to derive baking lessons; thereby alleviating the necessity for a user to relying on personal experience or trial and error to achieve a desired product. In another example, one or more embodiments described herein can facilitate automatically identifying maintenance issues with regard to an oven and/or managing preventative maintenance procedures. In another example, one or more embodiments described herein can facilitate the proper assembly of an oven. In a further example, various embodiments herein can automatically determine if an oven's operational conditions are compliant with a subject warranty.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate management of one or more smart ovens are described.

According to an embodiment, an oven system is provided. The oven system can comprise a memory that stores computer executable components. The oven system can also comprise a processor, operably coupled to the memory, and that executes the computer executable components stored in the memory. The computer executable components can comprise an oven management component that identifies a parameter of a completed bake based on a second parameter of a new bake and shares the parameter with an input device.

According to another embodiments, oven system is provided. The oven system can comprise a sensor that determines an attribute of an oven component. Also, the oven system can comprise a memory that stores computer executable components. Further, the oven system can also comprise a processor, operably coupled to the memory, and that executes the computer executable components stored in the memory. The computer executable components can comprise a maintenance component that compares the attribute with data regarding previous operation of the oven component to determine whether the attribute is an operating anomaly.

According to another embodiment, an oven system is provided. The oven system can comprise a memory that stores computer executable components. The oven system can also comprise a processor, operably coupled to the memory, and that executes the computer executable components stored in the memory. The computer executable components can comprise an assembly component that retrieves an assembly instruction stored in the memory and sends the assembly instruction to a device in response to a completion of a task.

According to another embodiment, an oven system is provided. The oven system can comprise a memory that stores computer executable components. The oven system can also comprise a processor, operably coupled to the memory, and that executes the computer executable components stored in the memory. The computer executable components can comprise a warranty compliance component that receives a setting regarding an oven and determines whether the setting is within a value range defined by a warranty regarding the oven.

DETAILED DESCRIPTION

Figure 1:
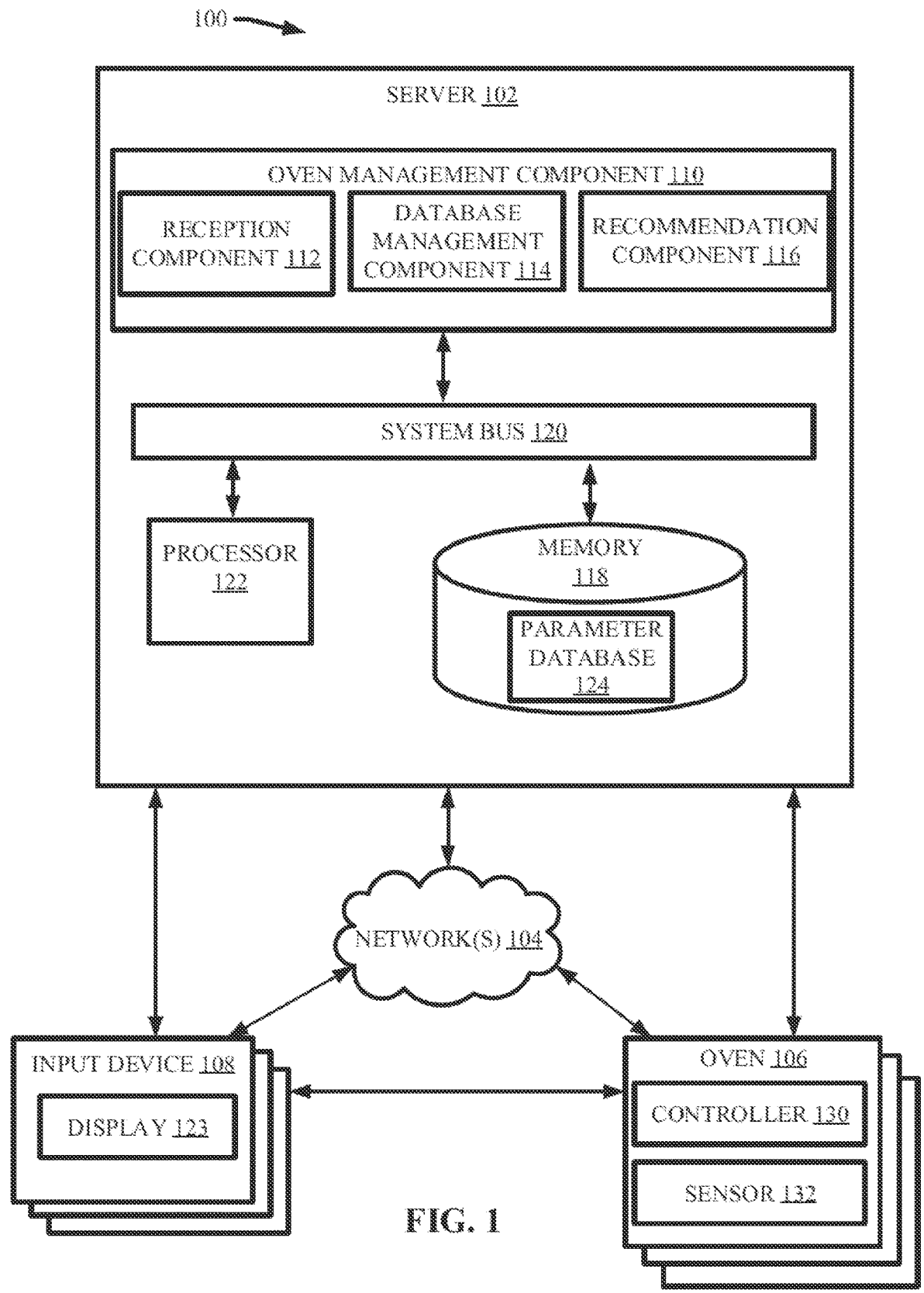
FIG. 1 illustrates a block diagram of an example, non-limiting oven system that can that can facilitate management of one or more smart ovens in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Provided is a detailed description on cloud computing. The embodiments described herein can be implemented in conjunction with a cloud computer environment. However, it is to be understood that the embodiments described herein are also capable of being implemented in conjunction with any other type of computing environment.

Cloud computing can serve as a convenient and reliable technology for providing an entity with access to a shared pool of computer resources. For example, cloud computing technology can enable an entity to access various networks, servers, computerized devices, software applications, storage, and services comprising the cloud environment. Further, access to the computer resources in the cloud environment can be managed via minimal interaction between the entity and a service provider. In various embodiments, a cloud environment can comprise multiple characteristics, service models, and/or deployment models.

Example characteristics of a cloud environment can include, but are not limited to: on-demand self-service, broad network access, resource pooling, rapid elasticity, and/or measured service. On-demand self-service can enable an entity to unilaterally provision computer resources (e.g., server time and network storage) as need automatically and with or without requiring human interaction with a provider of the computer resources. Cloud computing can provide broad network access over one or more networks via standard mechanisms that are compatible with various client platforms (e.g., mobile devise, computers, and/or personal digital assistants (PDAs).

In various cloud computing embodiments, a service provider's computing resources can be pooled to facilitate serving multiple entities simultaneously and/or sequentially. Different physical and/or virtual resources can be dynamically assigned and/or reassigned to meet the entity's demands. As such, entities utilizing the cloud environment generally have no control or knowledge over the exact location of the pooled resources but may identify a location with a high level of abstraction (e.g., country, state, and/or datacenter).

Additionally, cloud computing capabilities can be rapidly and elastically provisioned. For example, said capabilities can be automatically provisioned to quickly scale out and rapidly scale in. For an entity consuming the services of the cloud environment, capabilities for provisioning can appear to appear vast and available in any desired quantity at any desired time. Cloud computing systems can also automatically control and optimize the use of computer resources by leveraging a metering capability at a level of abstraction in accordance with the type of service provided by the cloud environment (e.g., storage, processing, and/or bandwidth). Computer resources comprising the cloud environment can be monitored, controlled, and/or reported to provide transparency and/or accountability for a consuming entity and/or a provider of the cloud's services.

Example service models of cloud computing can include, but are not limited to: software as a service (SaaS), platform as a service (PaaS), and/or infrastructure as a service (IaaS). In SaaS models, a service provider can enable an entity to use one or more applications (e.g., created by the provider) operating in a cloud infrastructure. Further, an entity can access an application on the cloud environment via one or more client interfaces such as a web browser. In other words, an entity utilizing the application can readily access the application through multiple platforms without having to maintain the cloud infrastructure.

In PaaS models, an entity can deploy their own applications on a cloud environment using programming tools supplied and/or supported by the provider of the cloud infrastructure. In IaaS models, the cloud environment provisions computer resources (e.g., processing, networks, and/or storage) for an entity to utilize when operating arbitrary software such as operating systems and applications. Thus, in the PaaS and/or IaaS models, the entity does not have control over the underlying cloud structure, but can control subject applications (e.g., the operating system) and configurations (e.g., networks and firewalls).

Example deployment models of cloud computing can include, by are not limited to: private clouds, community clouds, public clouds, and/or hybrid clouds. A private cloud model can be operated for a specific entity while denying access/services to alternate parties. The cloud can be managed by the specific entity or a third party and can be located on the entity's premises or off the entities premises. A community cloud can be operated for a plurality of organizations that share a common interest and/or concern (e.g., common mission, common security requirements, common policy, and/or common compliance considerations). Like the private cloud, the community cloud can be managed by one or more of the plurality of organizations and/or a third party.

A public cloud can be operated for the general public and/or a large group of entities (e.g., an industry). Further, public clouds can be owned by an organization that sells cloud services. A hybrid cloud can be a cloud infrastructure comprising two or more different deployment models (e.g., a private cloud and a community cloud). The various deployment models in the hybrid cloud structure can remain unique entities but be bound together by standardized or proprietary technology that can facilitate data and/or application portability (e.g., cloud bursting).

A cloud computer environment can comprise one or more nodes, wherein each node can be a computerized device (e.g., a desktop computer, a laptop computer, a mobile device, a tablet, an automobile system, and/or the like) used by a consumer of cloud services. The nodes can be connected via one or more networks in order to facilitate communication between the nodes and access to the cloud environment. Further, the nodes can be physically and/or virtually grouped in one or more networks to enable one or more deployment models. One of the advantages of cloud computing is the ability to provide services to a consumer via a multitude of platforms without requiring the consumer to sustain and/or maintain computer resources on a specific device.

FIG. 1 illustrates a block diagram of an example, non-limiting system 100 that can facilitate management of one or more ovens. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, one or more ovens 106, and one or more input devices 108. The server 102 can comprise an oven management component 110. The oven management component 110 can further comprise reception component 112, database management component 114, and/or recommendation component 116. Also, the server 102 can comprise or otherwise be associated with at least one memory 118. The server 102 can further comprise a system bus 120 that can couple to various components, such as, but not limited to, the oven management component 110 and associated components, memory 118, and/or processor 122. While a server 102 is illustrated in FIG. 1, in other embodiments, multiple devices of various types can be associated with or comprise the features shown in FIG. 1.

The one or more networks 104 can comprise wired and wireless networks, including, but not limited to, a cellular network, a wide area network (WAN) (e.g., the Internet) or a local area network (LAN). For example, the server 102 can communicate with the one or more ovens 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the oven management component 110 can be provided on the one or more servers 102, it should be appreciated that the architecture of system 100 is not so limited. For example, the oven management component 110, or one or more components of oven management component 110, can be located at another computer device, such as another server device, a client device, etc. In one or more embodiments, the oven management component 110, or one or more components of oven management component 110, can be located at the one or more ovens 106.

The one or more input devices 108 can be computer devices used in conjunction with a processor (e.g., processor 122). Example, input devices 108 include, but are not limited to: a personal computer, a desktop computer, a smart phone, a mobile device, a computer tablet, a laptop, a keyboard, a mouse, a touch screen, a combination thereof, and the like. In various embodiments, a user of the system 100 can utilize the input device 108 to: set one or more baking parameters for one or more of the ovens 106; provide one or more item parameters describing characteristics of an item to be baked; and/or provide one or more product parameters describing characteristics of the item subsequent to the bake. In one or more embodiments, a user of the system 100 can also utilize the input device 108 to update and/or otherwise edit information stored in the memory 118. The one or more input devices 108 can include, for example, a display 123 configured to present images and/or three dimensional projections to a user of the system 100. For example, the display 123 can be configured to present images, videos, and/or text to a user of the system 100. The one or more input devices 108 can also comprise microphones and/or speakers. For example, the microphones can capture noises and/or audio inputs provided from a user of the system 100, and the speakers can play one or more audio signals to the user.

A parameter database 124 can be stored in the memory 118, a cloud environment, a combination thereof, and/or the like. The one or more input devices 108 can access the parameter database 124 via a direct connection and/or the one or more networks 104. The parameter database 124 can comprise information relating to one or more bakes performed by the one or more ovens 106. Each bake performed by the ovens 106 can be assigned an identifier, such as a numeric identifier (e.g., via the one or more ovens 106 and/or the one or more input devices 108). Associated with each identified bake, the parameter database can store baking parameters, item parameters, and/or product parameters. As used herein, the term "baking parameter" can refer to one or more settings implemented by an oven 106 during a bake. Example baking parameters can include, but are not limited to: temperature of the oven, duration of the bake, humidity of the oven during the bake, variations in temperature during the bake, whether a quenching process is conducted subsequent to the bake, material details regarding any subsequent quenching process (e.g., a type of coolant used), pressure, flow rate, one or more proportional-integral-derivative (PID) controls, a combination thereof, and/or the like. As used herein, the term "product parameter" can refer to one or more characteristics (e.g., physical and/or chemical properties) of an item baked in accordance with one or more baking parameters. Example, product parameters can include, but are not limited to: the final temperature of the item at the conclusion of the bake, the hardness of the item subsequent to the bake, the composition of the item (e.g., the molecular alignment elements comprising the item) subsequent to the bake, the amount of heat absorbed by the item during the bake, the rigidity of the item subsequent to the bake, the malleability of the item subsequent to the bake, the size of the item subsequent to the bake, the color of the item subsequent to the bake, the elasticity of the item subsequent to the bake, a combination thereof, and/or the like. As used herein, the term "item parameter" can refer to one or more characteristics (e.g., physical and/or chemical properties) of an item to be baked by a subject oven 106. Example item parameters can include, but is not limited to: a temperature of the item prior to the bake, the hardness of the item prior to the bake, the composition of the item (e.g., the molecular alignment elements comprising the item) prior to the bake, the rigidity of the item prior to the bake, the malleability of the item prior to the bake, the size of the item prior to the bake, the color of the item prior to the bake, the elasticity of the item prior to the bake, a combination thereof, and/or the like. The parameter database 124 can also include a title of the item subject to baking and/or an oven identifier to indicate the oven 106 that performed a subject bake. Below, Table 1 illustrates an example format for the one or more parameter databases 124.

TABLE 1

| Entry | Bake Identifier | Oven Identifier | Item | Item Parameters | Baking Parameters | Product Parameters |
|---|---|---|---|---|---|---|
| | | | | | | |

The one or more ovens 106 can comprise one or more controllers 130 that can receive baking parameters and/or item parameters from the one or more input devices 108. The one or more controllers 130 can adjust one or more settings of the oven 106 in accordance with one or more received baking parameters and/or item parameters. For example, the controller 130 can set the operating temperature of the oven 106 and/or the duration of oven's 106 operation based on the one or more baking parameters and/or item parameters. In various embodiments, the controller 130 can also send one or more bake identifiers, baking parameters, and/or item parameters to the oven management component 110 (e.g., via the reception component 112) through a direct operable connection and/or via the one or more networks 104.

In one or more embodiments, the one or more ovens 106 can also comprise one or more sensors 132. The one or more sensors 132 can determine one or more product parameters of an item subsequent to a subject bake in the oven 106. Example sensors include, but are not limited to: thermometers, infrared sensors, lasers, cameras (e.g., thermal imaging cameras, motion cameras, infrared cameras, and/or digital cameras), pressure sensors, scales, microphones, a combination thereof, and the like. The controller 130 can be configured to direct the one or more sensors 132 to autonomously determine one or more product parameters. Also, the controller 130 can send one or more determined product parameters to the oven management component 110 along with the corresponding baking identifier for the subject bake.

The reception component 112 can be operably coupled to the one or more oven 106 and/or the one or more input devices 108 either directly or via the one or more networks 104. Additionally, the reception component 112 can be operably coupled to the various components described herein either directly, via the system bus 120, and/or via the one or more networks 104.

The database management component 114 can receive (e.g. via the reception component 112) one or more baking identifiers, baking parameters, item parameters, and/or product parameters from the one or more input devices 108 and/or the one or more ovens 106 (e.g., via the controller 130). In various embodiments, a user of the system 100 can set up a bake with one or more of the ovens 106 by inputting, for example, a bake identifier, one or more baking parameters and/or item parameters into the one or more input devices 108. The one or more input devices 108 can send the inputted bake identifier, baking parameters, and/or item parameters to the database management component 114 (e.g., via the reception component 112) through a direct connection and/or the one or more networks 104. Upon receiving the bake identifier, baking parameters, and/or item parameters, the database management component 114 can update the parameter database 124.

The recommendation component 116 can generate one or more recommendations based on one or more product parameters and send the recommendations to the one or input devices 108 (e.g., via the one or more networks 104). In various embodiments, the one or more recommendations can comprise baking parameters, item parameters, and/or product parameters of one or more bakes that have similar characteristics as a subject bake inputted into the system 100 via an input device 108. For example, wherein one or more previously conducted bakes comprise the same item parameters as a subject bake, the recommendation component 116 can generate one or more recommendations comprising the bake identifier, baking parameters, and/or product parameters of the previous bakes. Thus, a user of the system 100 can view the one or more recommendations (e.g., via an input device 108) and decide whether to utilize alternate baking parameters to achieve more desirable product parameters. In another example, a user can input into the system 100 (e.g., via the one or more input devices 108) one or more product parameters, recommendation component 116 can generate one or more recommendations comprising baking parameters and/or item parameters to achieve the inputted product parameters. Thus, a user of the system 100 can view one or more recommendations (e.g., via an input devices 108) that can be implemented to achieve a goal, such as a desired product parameter.

Figure 2:
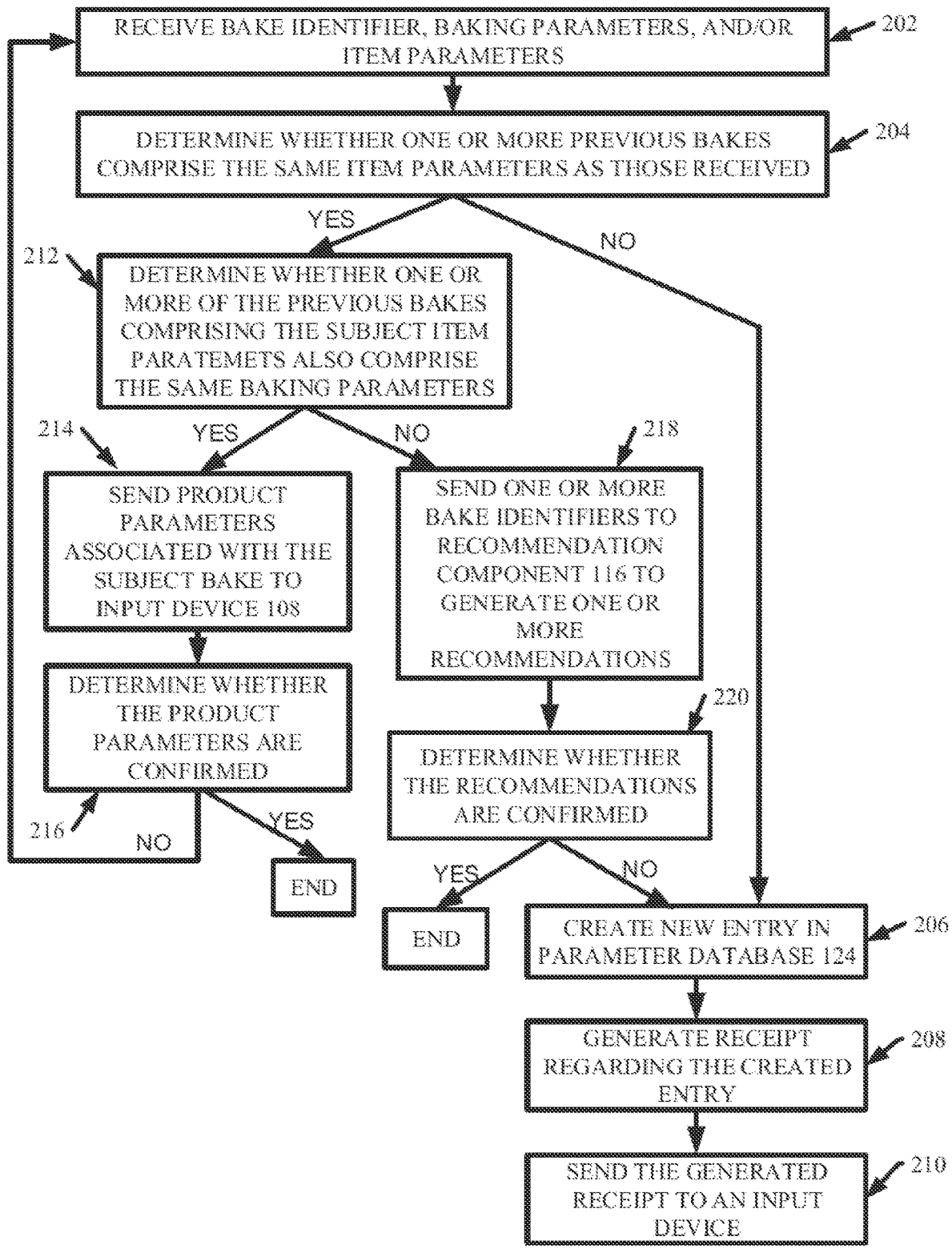
FIG. 2 illustrates a flow chart of an example, non-limiting process that can be implemented by the oven system in accordance with one or more embodiments described herein.

FIG. 2 illustrates a flow diagram of an example, non-limiting process 200 that can be implemented by the database management component 114 to update the parameter database 124. Repetitive description of like elements employed in other embodiments described herein is omitted for sake of brevity. For example, the database management component 114 can create a new entry in the parameter database 124, wherein the new entry can comprise the received bake identifier, baking parameters, and/or item parameters. Upon creating a new entry in the parameter database 124, the database management component 114 can send one or more receipts to the one or more input devices 108. In another example, the database management component 114 can analyze the parameter database 124 and edit an existing entry.

In various embodiments, at 202 the process 200 can comprise receiving a bake identifier, one or more baking parameters, and/or one or more item parameters from an input device 108. At 204, the database management component 114 can analyze the parameter database 124 to determine whether or not any previous bakes entered into the parameter database 124 comprise the same item parameters. At 206, in response to determining that previous bakes do not comprise the same item parameters, the database management component 114 can create a new entry in the parameter database 124. Further, at 208 the database management component 114 can generate a receipt regarding the created entry. At 210, the database management component 114 can send the generated receipt to the one or more input devices 108 (e.g., via the one or more networks 104).

At 212, in response to determining that a previous bake does have the same item parameters, the database management component 114 can determined whether one or more previous bakes with the same item parameters also comprised the same baking parameters as the received baking parameters. At 214, in response to determining that a previous bake with the same item parameters also comprised the same baking parameters, the database management component 114 can send one or more product parameters associated with the previous bake to the input device 108 (e.g., via the one or more networks 104) for the user to review. At 216, the database management component 114 can determine whether the product parameters are confirmed by a user of the system 100 (e.g., via the one or more input devices 108). If the subject product parameters are not confirmed, then the process 200 can start again from 202. For example, a user of the system 100 can review the product parameters, determine that said product parameters are undesirable, and/or submit a new bake identifier, baking parameters, and/or item parameters via the one or more input devices 108. If the subject product parameters are confirmed, then the process 200 can end without modifying the parameter database 124 at least because a previous bake comprising the same parameters is already included in the parameter database 124.

At 218, in response to determining that one or more previous bakes comprise the same item parameters but different baking parameters, the database management component 114 can send one or more bake identifiers regarding the previous bakes to the recommendation component 116 to generate one or more recommendations. At 220, the database management component 114 can determine whether the generated recommendations are confirmed. If the recommendations are confirmed and/or selected, then the process 200 can end without modifying the parameter database 124 at least because the recommended parameters will be used to establish the subject bake and said parameters already comprise a bake represented in the parameter database 124. If the recommendations are not confirmed, the process 200 can proceed to 206, wherein the database management component 114 can create a new entry in the parameter database 124. Further, at 208 the database management component 114 generate a receipt regarding the created entry. At 204, the database management component 114 can send the generated receipt to the one or more input devices 108 (e.g., via the one or more networks 104).

FIG. 2 illustrates process 200 with the item parameters used as a basis for determination; however, in various embodiments the baking parameters can be used as a basis for determination. For example, at 204 the database management component 114 can determine whether one or more previous bakes comprise the same baking parameters as those received. Also, at 212, the database management component 114 can determine whether one or more of the previous bakes comprising the subject baking parameters also comprise the same item parameters.

Figures 3A, 3B:
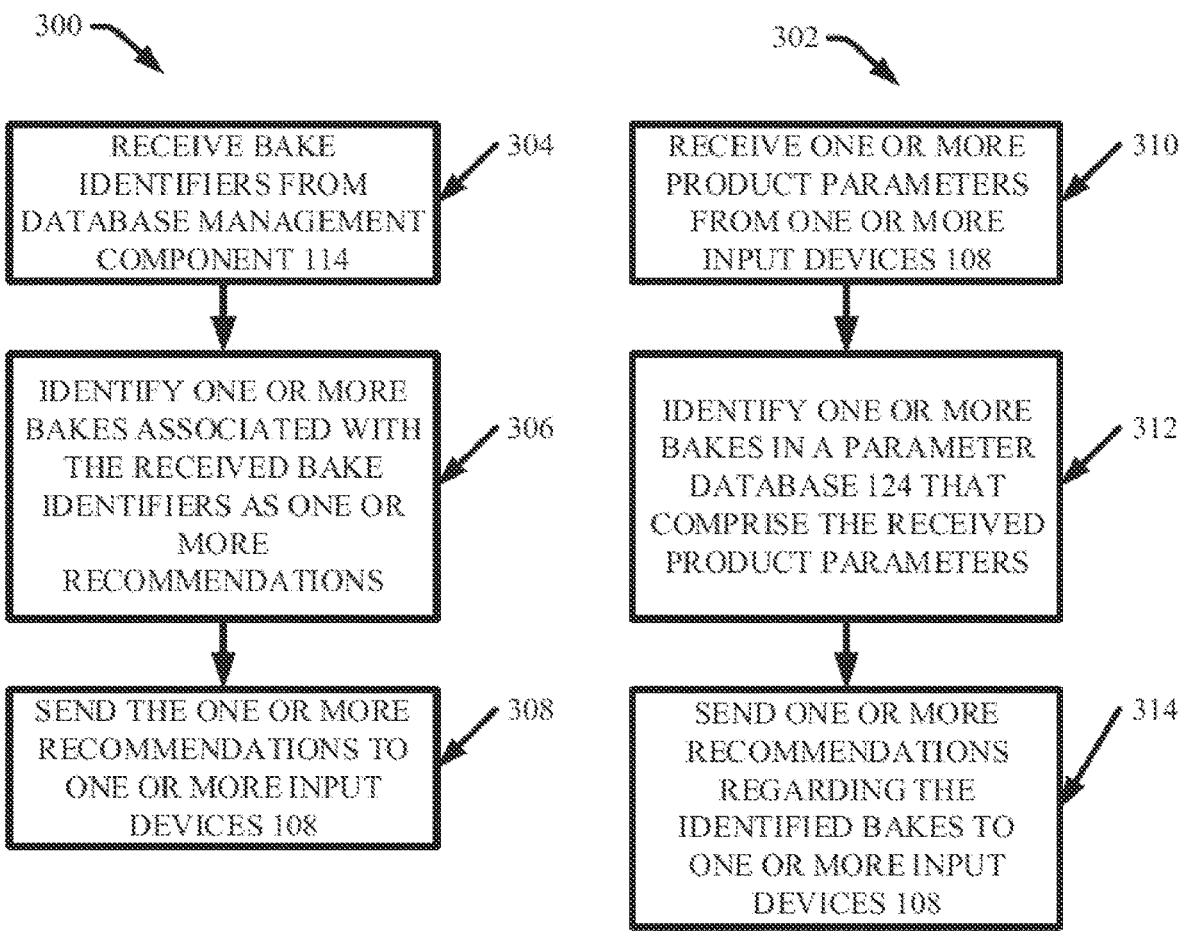
FIG. 3A illustrates a flow chart of another example, non-limiting process that can be implemented by the oven system in accordance with one or more embodiments described herein.
FIG. 3B illustrates a flow chart of another example, non-limiting process that can be implemented by the oven system in accordance with one or more embodiments described herein.

FIGS. 3A and 3B illustrate flow diagrams of example, non-limiting processes 300 and 302 that can be implemented by the recommendation component 116 to generate one or more recommendations. Repetitive description of like elements employed in other embodiments described herein is omitted for sake of brevity.

Referring to FIG. 3A, at 304 the process 300 can comprise the recommendation component 116 receiving (e.g., via the system bus 120 and/or the one or more networks 104) one or more bake identifiers (e.g., from the database management component 114). At 306, the recommendation component 116 can identify one or more bakes associated with the one or more bake identifiers that comprise similar and/or desired parameters. For example, the recommendation component 116 can identify one or more bakes associated with the one or more bake identifiers that comprise baking parameters within a threshold of deviation (e.g., a percentage or value) from the inputted baking parameters. In another example, the recommendation component 116 can identify one or more bakes associated with the one or more bake identifiers that are marked as producing desirable product parameters. The recommendation component 116 can generate one or more recommendations comprising information regarding the one or more identified bakes, such as, but not limited to, bake parameters and/or product parameters. At 308, the recommendation component 116 can send the one or more generated recommendations to one or more input devices 108 (e.g., via the one or more networks) for user review.

Referring to FIG. 3B, at 310 the process 302 can comprise the recommendation component 116 receiving (e.g., via the system bus 120 and/or the one or more networks 104) one or more product parameters from one or more input devices 108. At 312, the recommendation component 116 can identify one or more bakes in the parameter database 124 that are similar to the received product parameters. For example, the recommendation component 116 can identify bakes comprising the same product parameters as the received product parameters. In another example, the recommendation component 116 can identify bakes comprising product parameters within a threshold of deviation from the received product parameters (e.g., within a defined percent range of the received product parameter values and/or within a defined value range of the received product parameter values). Further, the threshold of deviation can be set by a user of the system 100 via the one or more input devices 108. At 314, the recommendation component 116 can generate one or more recommendations and send said recommendations to one or more input devise 108 (e.g., via the one or more networks 104) for user review. The generated recommendations can comprise information regarding the one or more identified bakes, such as, but not limited to: bake identifiers, baking parameters, and/or item parameters.

In response to receiving a receipt regarding a created entry, the one or more input devices 108 can send the bake identifier, one or more baking parameters, and one or more item parameters to the one or more ovens (e.g., via the one or more networks). One or more controllers 130 can receive the baking information (e.g., bake identifier, one or more baking parameters, and one or more item parameters) and adjust one or more settings of the oven so as to conduct a bake in accordance with said baking information. For example, the received baking information can comprise baking parameters indicating a defined temperature and duration, wherein the controller 130 can set the temperature and operating time of a respective oven 106 in accordance with said baking information.

In various embodiments, upon the completion of a bake in accordance with the received baking information, one or more sensors 132 can measure one or more product parameters of the subject baked item (e.g., the item baked in accordance to the baking information). Further, the controller 130 can send the measured one or more product parameters along with the bake identifier associated with the subject bake to database management component 114 (e.g., via the one or more networks 104). The database management component 114 can edit the entry created for the baking information associated with the subject bake to include the received product parameters; thereby completing the recently created entry.

In one or more embodiments, upon completion of a bake in accordance with the received baking information, a user of the system 100 can measure one or more product parameters of the subject baked item (e.g., the item baked in accordance to the baking information) and enter said product parameters into the input device 108 along with the bake identifier associated with the subject bake. The input device 108 can subsequently send the one or more product parameters to the database management component 114. The database management component 114 can edit the entry created for the baking information associated with the subject bake to include the received product parameters; thereby completing the recently created entry.

In response to receiving the one or more product parameters, the input device 108 can prompt a user of the system 100 to confirm that the inputted baking parameters are to be utilized. In other words, since the inputted baking parameters and item parameters have been used in the desired combination in a previous bake, the resulting product parameters are known and shown to a user of the system 100 (e.g., via the one or more input devices) for confirmation. If the user finds the product parameters acceptable, the user can confirm the product parameters via the input devices 108; whereupon the input device 108 can send the inputted baking information (e.g., the bake identifier, the one or more baking parameters, and/or the one or more item parameters) to the one or more ovens 106. One or more controllers 130 can receive the baking information (e.g., bake identifier, one or more baking parameters, and one or more item parameters) and adjust one or more settings of the oven so as to conduct a bake in accordance with said information. For example, the received baking information can comprise baking parameters indicating a defined temperature and duration, wherein the controller 130 can set the temperature and operating time of a respective oven 106 in accordance with said baking information. If the user finds the product parameters unacceptable, the user can cancel the inputted parameters and input new parameters.

In response to receiving one or more recommendations, the one or more input devices 108 can enable a user of the system 100 to select one or more of the received recommendations as the baking information for the subject bake. Also, the one or more input devices 108 can send the baking information (e.g., one or more selected recommendations) to the one or more ovens 106. One or more controllers 130 can receive the baking information (e.g., bake identifier, one or more baking parameters, and one or more item parameters) and adjust one or more settings of the oven so as to conduct a bake in accordance with said information. For example, the received baking information can comprise baking parameters indicating a defined temperature and duration, wherein the controller 130 can set the temperature and operating time of a respective oven 106 in accordance with said baking information. If the user finds the product parameters unacceptable, the user can cancel the inputted parameters and input new parameters.

Thus, in various embodiments described herein the server 102 can manage one or more databases regarding conducted bakes and/or generate one or more recommended bake settings based on previous bake experiences. Further the one or more servers 102 can communicate with a plurality of ovens 106 via a cloud environment (e.g., the one or more networks 104), thereby facilitating the sharing of baking information amongst a multitude of ovens and/or locations. Therefore, a user of the system 100 can leverage past bakes to avoid or repeat previous achieved product properties. Further, the autonomous nature of the system 100 enables baking information to stay constantly updated.

Figure 4:
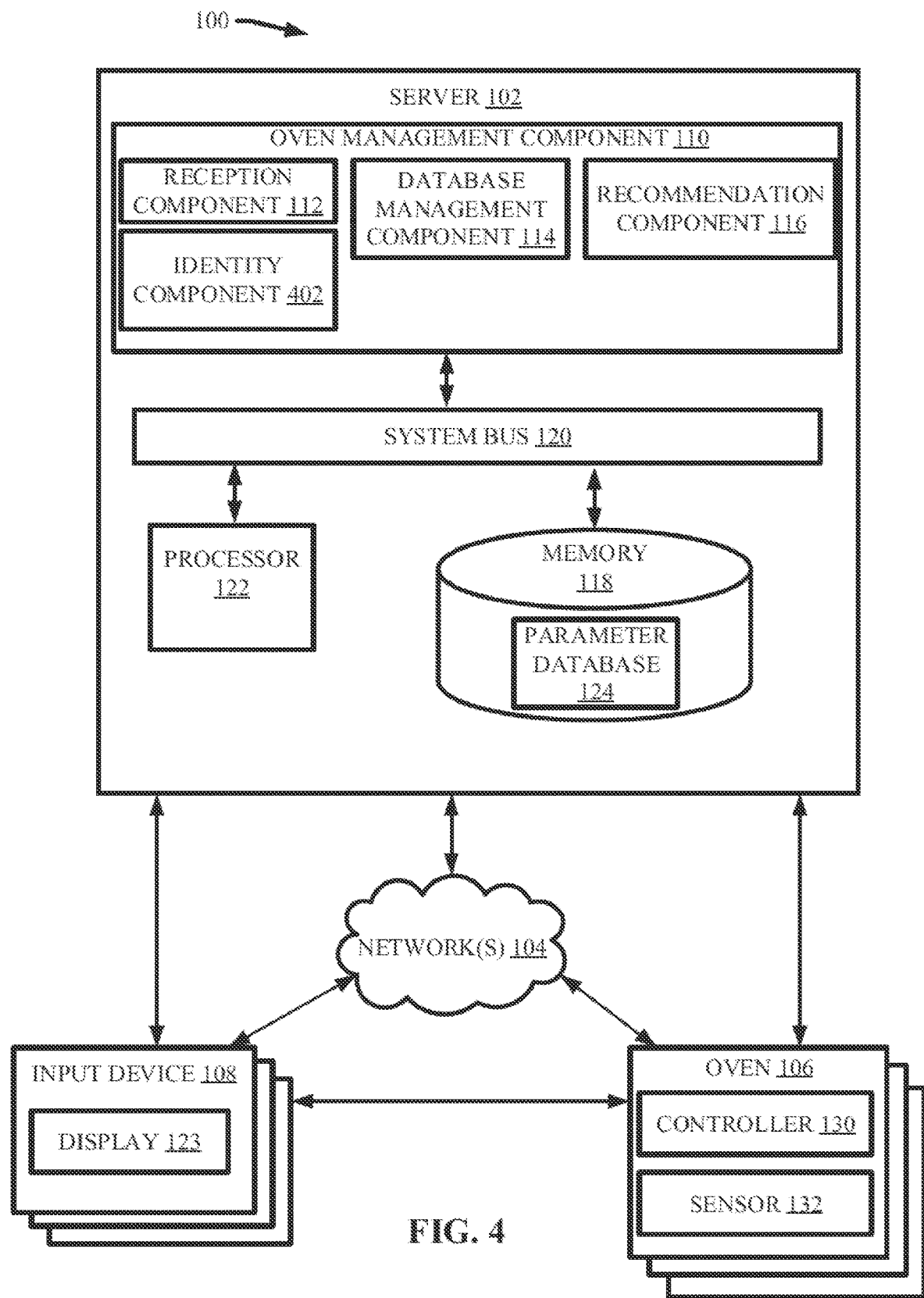
FIG. 4 illustrates a block diagram of an example, non-limiting oven system that can that can facilitate management of one or more smart ovens in accordance with one or more embodiments described herein.

Additionally, in various embodiments the system 100 further facilitate automatic functionality of one or more ovens 106. FIG. 4 illustrates a block diagram of the example, non-limiting system 100 further comprising an identity component 402. Repetitive description of like elements employed in other embodiments described herein is omitted for sake of brevity.

In various embodiments, the identity component 402 can utilize measurements determined by the one or more sensors 132 and analyze the parameter database 124 to determine the identity of an item placed in a subject oven 106. Additionally, the identity component 402 can determine the identify of an item based at least in part on item parameters received (e.g., via the one or more networks and/or the reception component 112) from the one or more input devices 108. Similar to the measurements regarding baked items, the one or more sensors 132 can measure one or more item parameters of an item prior to a bake. Also, one or more controllers 130 can send the measured item parameters to the identity component 402 (e.g., via the one or more networks and/or the reception component 112).

Figure 5:
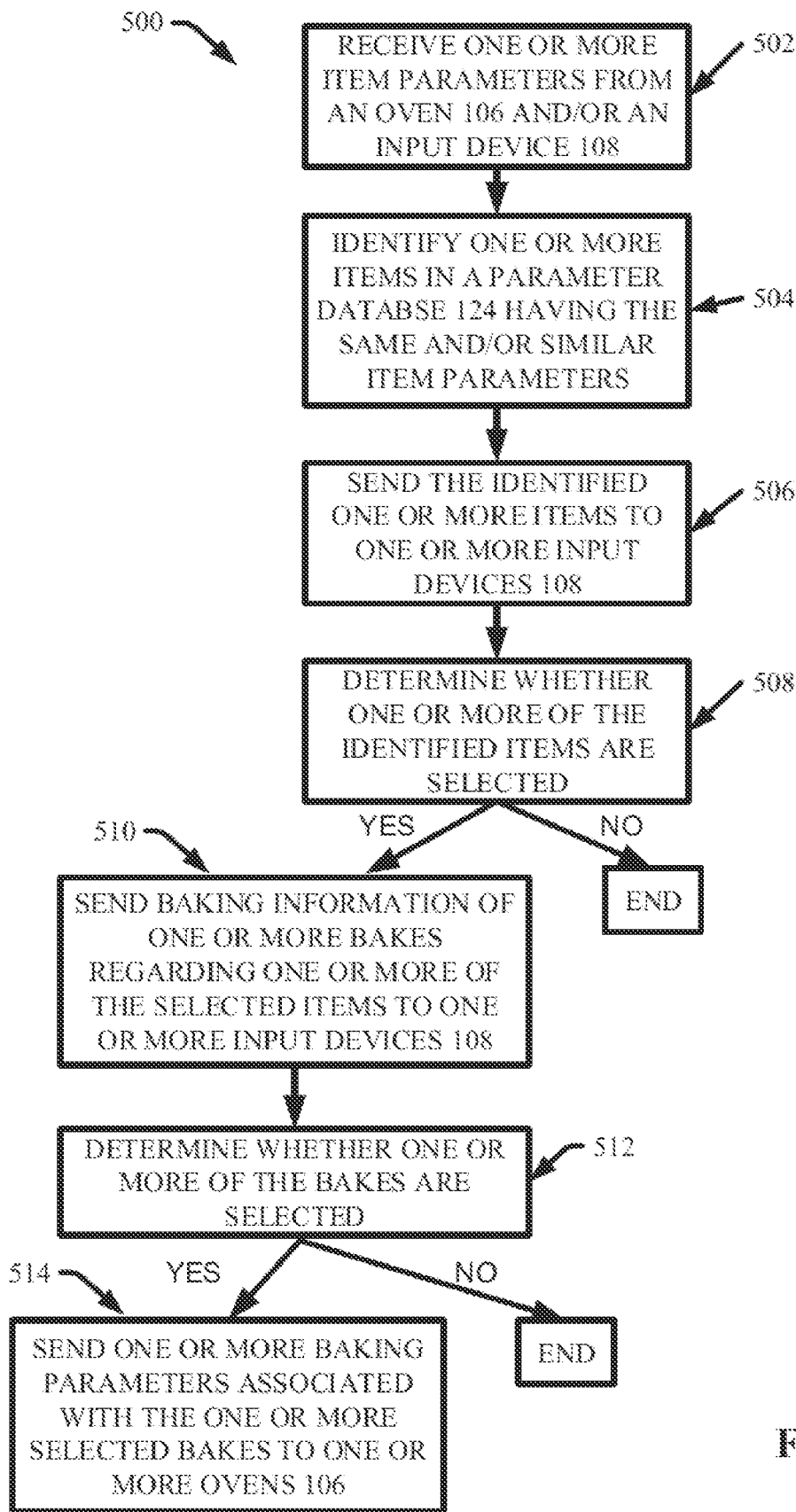
FIG. 5 illustrates a flow chart of another example, non-limiting process that can be implemented by the oven system in accordance with one or more embodiments described herein.

FIG. 5 illustrates a flow diagram of an example, non-limiting process 500 that can be implemented by the identity component 402 to identify one or more items placed within the one or more ovens 106 and facilitate the selection of baking information. Repetitive description of like elements employed in other embodiments described herein is omitted for sake of brevity.

At 502 the process 500 can comprise the identity component 402 receiving one or more item parameters from one or more ovens 106 and/or one or more input devices 108. The received item parameters can be measured and sent (e.g., via the one or more networks and/or the reception component 112) by the one or more ovens 106, and/or the received item parameters can be inputted into an input device 108 by a user of the system 100 and sent (e.g., via the one or more networks and/or the reception component 112) by the one or more input devices 108. At 504, the identity component 402 can analyze the one or more parameter databases 124 to identify one or more items with similar or the same item parameters as those received. For example, the identity component 402 can identify items having item parameters within a defined threshold of deviation from the received item parameters. The defined threshold can be defined by a user of the system 100 via the one or more input devices 108.

In various embodiments, the received one or more item parameters can comprise one or more images captured by the one or more sensors 132 and/or inputted via the one or more input devices 108. The identity component 402 can utilize artificial intelligence techniques to recognize an item based on said images. For example, the identity component 402 can utilize machine learning technology and/or neural networks to analyze the one or more images. Also, the identity component 402 can be trained using a variety of source images comprising known items.

At 506, the identity component 402 can send the one or more identified items to one or more input devices 108 for user review. At 508, the identity component 402 can determine whether the identified items are selected by a user of the system 100. For example, the input device 108 can display the identified items to the user, whereupon the user can choose to select one or more of the identified items (e.g., via the input device 108) or reject the identified items. If a user chooses to reject the identified items, the process 500 can end, whereupon the user can input alternative and/or additional baking information into the system 100 via an input device 108 to initiate a new process (e.g., process 200, 300, 302, and/or 500). If the user selects one or more of the identified items, then the input device 108 can send (e.g., via the one or more networks 104) a selection confirmation to the identity component 402.

Upon receiving a selection confirmation, the identity component 402 can determine that one or more of the identified items are selected and, at 510, send (e.g., via the one or more networks 104) baking information (e.g. one or more bake identifiers, baking parameters, item parameters, and/or product parameters) of one or more bakes regarding one or more of the selected items to one or more input devices 108. At 512, the identity component 402 can determine whether one or more of the baking information is selected by the user of the system 100. For example, the input device 108 can display the baking information to the user, whereupon the user can choose to select one or more of the baking information (e.g., via the input device 108) or reject the baking information. If a user chooses to reject the baking information, the process 500 can end, whereupon the user can input alternative and/or additional baking information into the system 100 via an input device 108 to initiate a new process (e.g., process 200, 300, 302, and/or 500). If the user chooses to select one or more of the baking information, at 514 the identity component 402 and/or the input device 108 can send (e.g., via the one or more networks 104) the selected baking information to the one or more ovens 106. A controller 130 can receive the selected baking information and configure the oven's 106 settings in accordance with said baking information.

In various embodiments, the one or more ovens 106 can be modular in design, wherein one oven 106 can connect and/or disconnect from one or more other ovens 106 to change the oven's 106 capacity depending on the necessities of the subject bake. Further, the system 100 can comprise a navigation component 602 to facilitate autonomous movement of the one or more ovens 106 during the connection and/or disconnection procedures.

Figure 6:
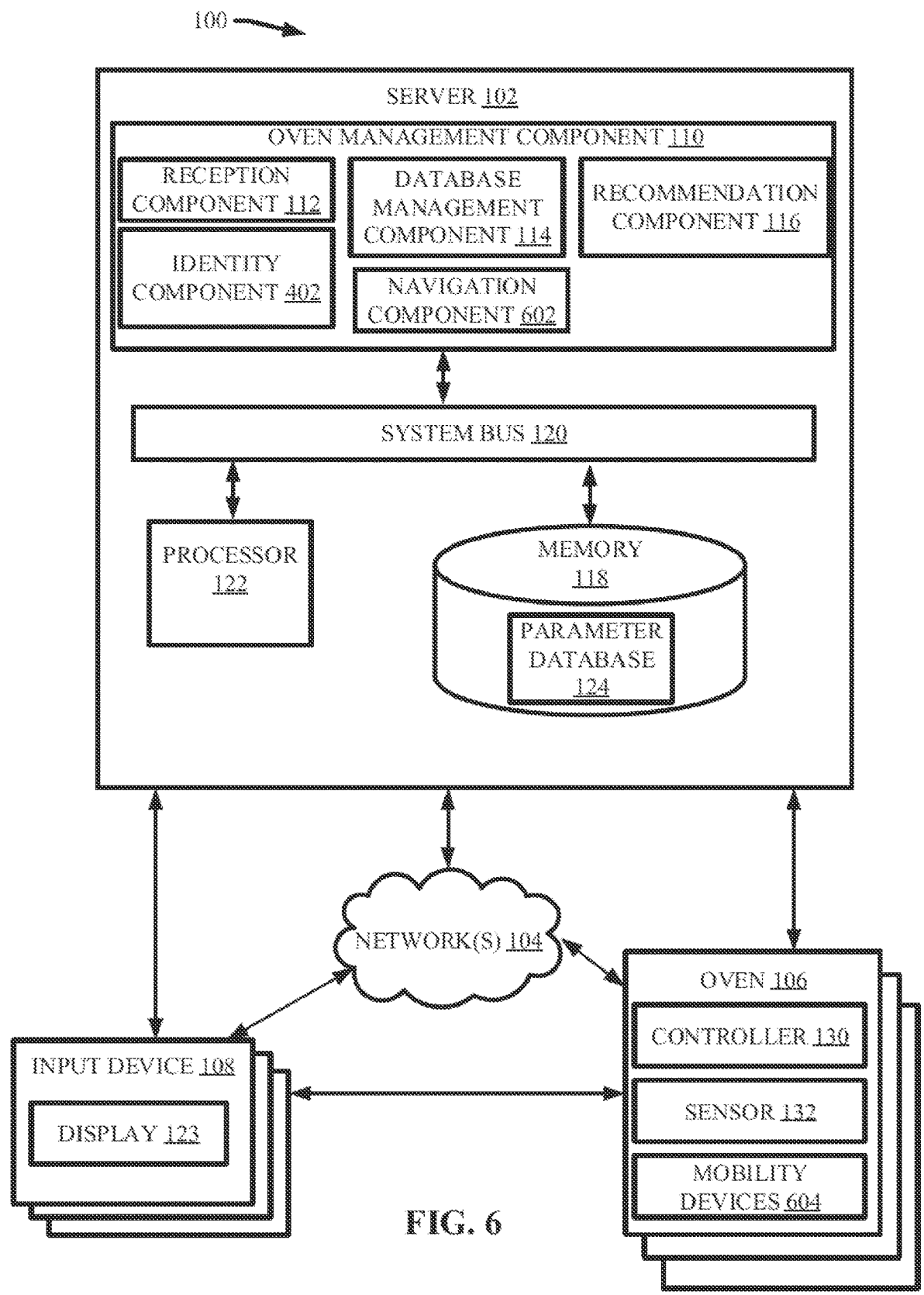
FIG. 6 illustrates a block diagram of an example, non-limiting oven system that can that can facilitate management of one or more smart ovens in accordance with one or more embodiments described herein.

FIG. 6 illustrates a block diagram of the example, non-limiting system 100 comprising the navigation component 602. Repetitive description of like elements employed in other embodiments described herein is omitted for sake of brevity. The one or more of the ovens 106 can comprise one or more auxiliary doors and/or one or more mobility devices 604.

The auxiliary doors can be positioned in various locations within the subject oven's 106 body and facilitate fluid communication between conjoined ovens 106. For example, an auxiliary door can be positioned on the right side of one oven 106 and the left side of another oven 106 such that the two ovens 106 can be positioned adjacent to each other with the auxiliary doors open to create a single oven with a total baking capacity larger than each individual oven 106. Also, the ovens 106 can comprise various latches, fasteners, and/or other types of locking mechanisms to create a seal between adjacent ovens 106. The auxiliary doors can be controlled manually and/or via one or more controllers 130.

One or more of the ovens 106 can comprise one or more mobility devices 604 to facilitate positioning of a respective oven 106 during conjoining and unjoining procedures. The mobility devices 604 can include, but are not limited to: wheels, axels, rods, guiding rails, lasers, cameras, motors (e.g., electrical motors and/or combustion engines), treads, gears, conveyer belts, a combination thereof, and/or the like. For example, one or more of the ovens 106 can include mobility devices 604 comprising a plurality of wheels connected to a motor via one or more axels, wherein the mobility devices 604 can enable the oven 106 to be moved from one location to another via rotation of the wheels. In another example, the one or more ovens 106 can include mobility devices 604 comprising one or more guide rails connected to a subject oven 106 along with a plurality of wheels connected to a motor via one or more axels, wherein the mobility devices 604 can facilitate rotating the wheels to drive the oven 106 along a path defined by the one or more guide rails. In another example, one or more of the ovens 106 can include mobility devices 604 comprising one or more conveyer belts powered by one or more motors, wherein movement of the conveyer belts along one or more conveyance paths in turn can move the subject oven 106 from one location and/or position to another location and/or position.

While FIG. 6 illustrates the oven 106 comprising the one or more mobility devices 604, an operating environment of the one or more ovens 106 can also comprise at least a portion of the mobility devices 604. For example, the operating environment can comprise facilities in which the one or more ovens 106 are located (e.g., a factory and/or warehouse), and said operating environment can comprise one or more mobility devices 604 (e.g., lasers, cameras, guiding rails, electrical connection, a combination thereof, and/or the like) that can gather navigational information and send said navigational information to the navigation component 602 (e.g., via the one or more networks 104 and/or the reception component 112). For example, the one or more mobility devices 604 can comprise a plurality of cameras located within a subject oven's 106 operating environment, wherein said cameras can send one or more images to the navigation component 602 to facilitate the navigation component 602 in instructing the one or more ovens 106 to avoid obstacles.

In various embodiments, the navigation component 602 can receive navigational information from the one or more mobility devices 604. The navigational information can facilitate the navigation component 602 in tracking the location of a subject oven 106 and/or controlling movements of the subject oven 106. The navigational information can include, but is not limited to: global positioning information, distance to and/or from objects (e.g., as measured by a laser), speed the subject oven 106 is moving, the number of objects in proximity to the subject oven 106, a direction the subject oven 106 is facing, a combination thereof, and/or the like. For example, the one or more mobility devices 604 can comprise one or more lasers that detect the presence and/or distance of one or more object in relation to the subject oven 106. The mobility devices 604 can send said detections as navigational information (e.g., via the one or more networks 104 and/or the reception component 112) to the navigation component 602. The navigation component 602 can use said navigation information to control the movement of the subject oven 106 from a first location to a second location while avoiding the detected objects.

In one or more embodiments, the navigation component 602 can instruct one or more controllers 130 to engage one or more mobility devices 604 in one or more predetermined maneuvers. For example, the navigation component 602 can instruct a controller 130 to direct one or more mobility devices to operate such that the subject oven 106 follows a predefined path (e.g., move the oven 106 a fist distance in a first direction and a second distance in a second direction). Thus, the navigation component 602 can instruct one or more ovens 106 to move in accordance to one or more predefined maneuvers. The predefined maneuvers can be based on the starting position and ending position of the subject oven's 106 movement. For example, the predefined maneuvers can regard positioning two or more ovens 106 adjacent to each other for joining, wherein one or more ovens 106 moves from a storage position on a facility's floor to an operating position on the facility's floor.

The starting position, ending position, and/or predefined maneuver can be inputted into the system 100 as navigational information by a user via the one or more input devices 108. For example, via the input device 108, a user of the system 100 can select one or more ovens 106 to be moved and designate an ending position for the ovens 106. The navigation component 602 can receive the navigational information from the input device 108 (e.g., via the one or more networks 104 and/or the reception component 112) and instruct one or more ovens 106 (e.g., via one or more controllers 130) to move from one location to another, wherein additional navigational information received by one or more of the moving ovens 106 (e.g., measured and/or detected by one or more mobility devices 604) can be sent to the navigation component 602 to facilitate the navigation component 602 instructing the oven 106 to avoid obstacles (e.g., via one or more controllers 130).

Thus, the navigation component 602, in conjunction with one or more mobility devices 604 attached to a subject oven 106, can automatically instruct one or more ovens 106 to move from one location to another location based on navigational information received from an input device 108 and/or one or more ovens 106 (e.g., via the one or more networks 104, the mobility devices 604, and/or one or more controllers 130). The navigation component 602 can facilitate moving one or more ovens 106 in accordance with one or more predetermined maneuvers and to avoid detected obstacles. Moving of the ovens 106 can be performed to facilitate a connection or disconnection of two or more ovens 106 and/or to relocate one or more ovens 106 based on the subject oven's 106 operational status.

Figure 7:
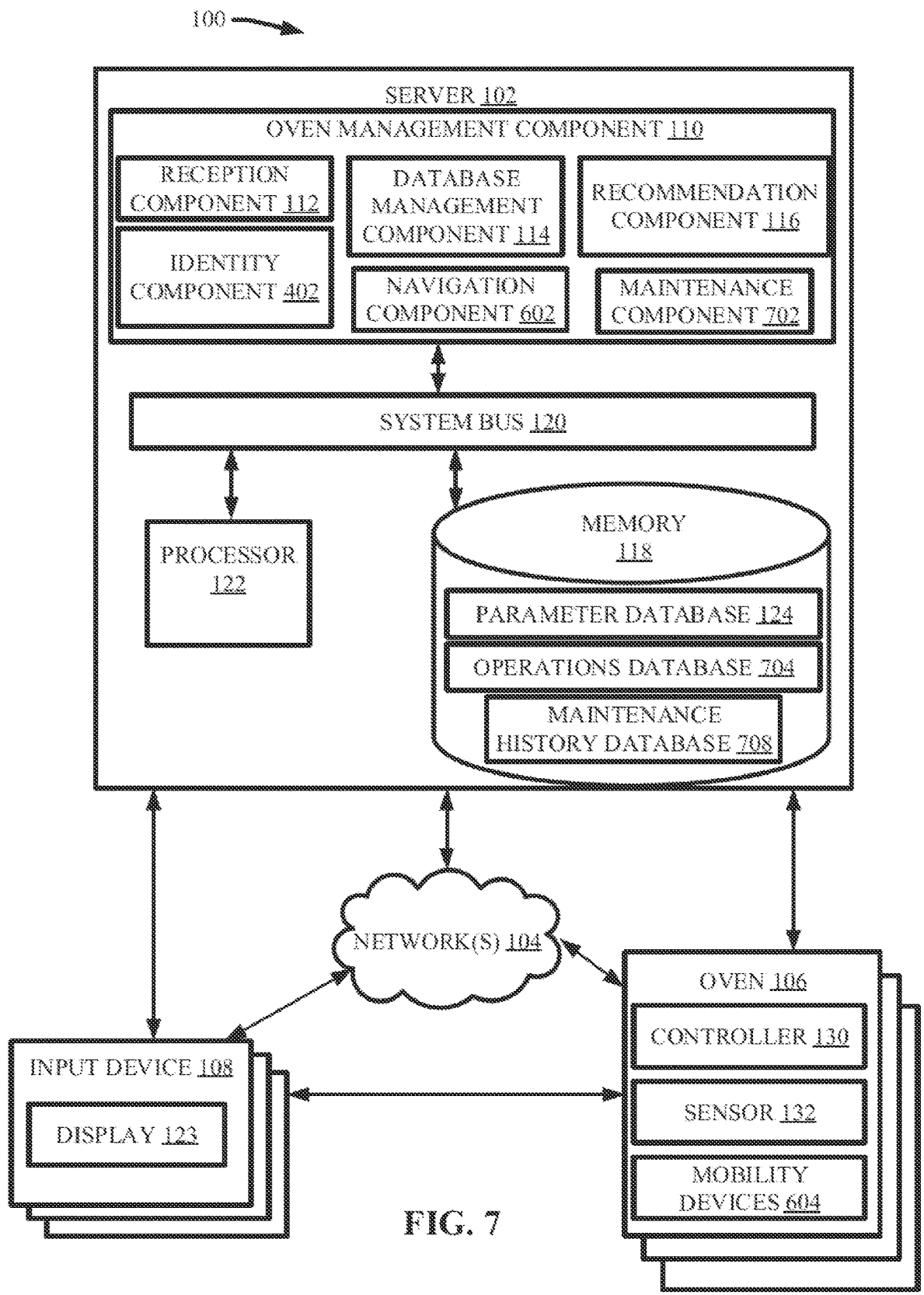
FIG. 7 illustrates a block diagram of an example, non-limiting oven system that can that can facilitate management of one or more smart ovens in accordance with one or more embodiments described herein.

FIG. 7 illustrates a block diagram of the example, non-limiting system 100 further comprising maintenance component 702. Repetitive description of like elements employed in other embodiments described herein is omitted for sake of brevity. The maintenance component 702 can facilitate automatic recognition and preventative maintenance of one or more ovens 106. In various embodiments, the maintenance component 702 can identify one or more mechanical malfunctions in one or more ovens 106 and: alter operations of the subject oven 106 to utilize auxiliary parts, schedule repairs, and/or warn a user of the system 100. In one or more embodiments, the maintenance component 702 can also facilitate preventative maintenance procedures by managing routine maintenance inspections and/or warning a user of the system 100 when a subject oven 106 is being operated in contradiction to manufacturer recommendations.

In various embodiments, the maintenance component 702 can communicate with the one the one or more sensors 132 to identify one or more conditions that can indicate a maintenance issue. In addition to the measurements regarding baking information described herein, the one or more sensors 132 can further monitor operating conditions of various components of the one or more ovens 106. The one or more sensors 132 can collect maintenance information regarding one or more components of the ovens 106, wherein said maintenance information can include, but is not limited to: sound emanating from a subject component, vibrations emanating from a subject component, heat emanating from a subject component, moisture in proximity to a subject component, voltage and/or current being supplied and/or produced by a subject component, fluid volume associated with one or more subject components, a combination thereof, and/or the like. The one or more sensors 132 can send the maintenance information to the maintenance component 702 (e.g., via the one or more networks and/or the reception component 112), whereupon the maintenance component 702 can analyze the maintenance information for abnormalities. To detect said abnormalities, the maintenance component 702 can compare the received maintenance information with previously received maintenance information and/or with maintenance information designated as being associated with proper operating conditions.

For example, the one or more sensors 132 can comprise one or more microphones that detect noise emanating from one or more components of a subject oven 106. The sensors 132 can send (e.g., via the one or more networks and/or the reception component 112) sound data regarding the detected noise to the maintenance component 702 to be analyzed. The maintenance component 702 can analyze the received sound data to detect abnormalities as compared to previously received sound data. Said abnormalities can include, but are not limited to: a decibel increase or decrease in the sound data as compare to previous sound data, a change in pitch in the sound data as compared to previous sound data, a lack of sound, an interruption in sound, a combination thereof, and/or the like. For example, a sensor 132 can collect sound data regarding one or more belts in the oven 106, wherein the maintenance component 702 can determine an abnormality exists with regard to the one or more belts based on an increased pitch (e.g., a squeaking noise) detected in the sound data.

In response to detecting an abnormality, the maintenance component 702 can generate and send (e.g., via the one or more networks and/or the reception component 112) a warning to one or more input devices 108 for a user to review, wherein the warning can include information regarding the abnormality and the component associated with said abnormality. Also, in response to detecting an abnormality, the maintenance component 702 can instruct one or more controllers 130 to: terminate operation of the subject oven 106, and/or change use of the component associated with said abnormality with an auxiliary component. Moreover, in response to detecting an abnormality, the maintenance component 702 can schedule a maintenance inspection regarding the subject oven 106.

In one or more embodiments, the maintenance component 702 can also monitor a history of use regarding one or more of the ovens 106 to facilitate preventative maintenance procedures in accordance with one or more manufacturer recommendations. The maintenance component 702 can manage an operations database 704. The operations database 704 can be stored in the memory 118 and/or be located in a cloud environment (e.g., via the one or more networks 104). The operations database 704 can include maintenance information regarding previous operations of a subject oven 106. In response to receiving and analyzing maintenance information, the maintenance component 702 can store maintenance information within the operations database 704.

The maintenance component 702 can monitor the operations database 704 to identify landmarks with regard to one or more oven 106 components. The maintenance component 702 can analyze the totality of maintenance information within the operations database 704 with regard to a subject component in determining whether operation of the subject component meets one or more landmarks. As used herein, the term "landmarks" can refer to data regarding a subject oven 106 component and/or oven 106 that indicates when a maintenance inspection and/or maintenance procedure should be conducted. The landmarks can be based on manufacturer recommendations and/or user preference and can be inputted via the one or more input devices 108. Also, the landmarks can be stored within the operations database 704 and/or within the memory 118. For example, the maintenance information can comprise start times and/or end times of a subject oven's 106 motor. The maintenance component 702 can store the on and off times of the subject motor within the operations database 704. Further, the maintenance component 702 can analyze all the stored on and off times within the operations database 704 to determine a total run time for the life of the motor. Also, the maintenance component 702 can compare the determined total run time with one or more landmarks (e.g., a recommendation by a manufacturer of the motor to perform a maintenance procedure for every two years of run time).

In response to determining that maintenance information stored in the operations database 704 meets one or more landmarks, the maintenance component 702 can generate and send (e.g., via the one or more networks and/or the reception component 112) a warning to one or more input devices 108 for a user to review, wherein the warning can include information regarding the landmark and the maintenance information associated with said landmark. Moreover, in response to determining that maintenance information stored in the operations database 704 meets one or more landmarks, the maintenance component 702 can schedule a maintenance inspection regarding the subject oven 106.

In various embodiments, the maintenance component 702 can also manage one or more maintenance records regarding scheduled and/or previously conducted maintenance procedures. Further, the maintenance component 702 can generate one or more maintenance recommendations based on the maintenance records. The maintenance records can be stored in a maintenance history database 708 that can be stored in the memory 118 and/or a cloud environment (e.g., via the one or more networks 104). The maintenance history database 708 can include maintenance history regarding one or more ovens 106 and/or one or more oven 106 components including, but not limited to: dates and/or times of scheduled maintenance inspections and/or procedures, dates and/or times of completed maintenance inspections and/or procedures, components subjected to scheduled and/or completed maintenance inspections and/or procedures, ovens 106 subjected to scheduled and/or completed maintenance inspections and/or procedures, results of scheduled and/or completed maintenance inspections and/or procedures (e.g., that status of one or more components), a combination thereof, and/or the like.

The maintenance component 702 can automatically create new entries in the maintenance history database 708 in response to scheduling a maintenance inspection and/or procedure. Also, the maintenance component 702 can receive one or more entries to be included in the maintenance history database 708 from one or more input devices 108 (e.g., via the one or more networks 104 and/or the reception component 112). For example, a user of the system 100 can enter information regarding a scheduled and/or conducted maintenance inspection and/or procedure into an input device 108, wherein said information can be sent to the maintenance component 702 to be included in the maintenance history database 708. Further, the maintenance component 702 can edit one or more entries in the maintenance history database 708. For example, the maintenance component 702 can edit an existing entry in the maintenance history database 708 to update the entry to reflect that a scheduled maintenance inspection has been completed.

The maintenance component 702 can analyze the maintenance history database 708 to determine whether or not a maintenance inspection and/or procedure is required in accordance with one or more maintenance settings. The maintenance settings can be entered into the system 100 by a user via the one or more input devices 108. The maintenance settings can indicate a desired frequency to perform a maintenance inspection and/or procedure with regards to one or more ovens 106 and/or one or more oven 106 components. For example, the maintenance settings can indicate that a maintenance inspection regarding the sensors 132 of an oven 106 be performed every two years. The maintenance component 702 can compare maintenance history stored in the maintenance history database 708 with the one or more maintenance settings to determine whether a maintenance inspection and/or procedure is required. For example, the maintenance component 702 can compare the maintenance history of an oven 106, which delineates that the last maintenance inspection performed on the oven 106 was one year and eleven months ago, and compare said maintenance history with one or more maintenance settings, which can delineate that each oven 106 is to be inspected every two years, to determine that a maintenance inspection and/or procedure is required within the next month.

In response to determining that maintenance inspection and/or procedure is required, the maintenance component 702 can generate and send (e.g., via the one or more networks and/or the reception component 112) a warning to one or more input devices 108 for a user to review, wherein the warning can include information regarding the maintenance history and the one or more maintenance settings. Moreover, in response to determining that a maintenance inspection and/or procedure is required, the maintenance component 702 can schedule a maintenance inspection and/or procedure regarding the subject oven 106. The maintenance component 702 can generate the warning and/or schedule the maintenance inspection and/or procedure within a threshold associated with the one or more maintenance settings, wherein the threshold can be a period of time. For example, the threshold can be one month, wherein the maintenance component 702 can generate the warning and/or schedule the maintenance inspection and/or procedure within one month of when the maintenance inspection and/or procedure is required by the maintenance settings.

In various embodiments, the maintenance component 702 can monitor the baking information implemented by the one or more controllers 130 to conduct a bake. The maintenance component 702 can compare oven settings configured by the one or more controllers 130 with one or more regulations. The regulations can delineate oven settings and/or operational conditions that increase the risk of malfunction with regards to one or more ovens 106 and/or one or more oven 106 components. The regulations can regard, for example: operational temperatures limits for one or more ovens 106, operation durations limits for one or more ovens 106, a combination thereof, and/or the like. The regulations can delineate operational limitations of one or more of the ovens 106 such that operating the subject oven 106 in contradiction to said regulations will likely cause one or more maintenance issues (e.g., hardware malfunctions). The regulations can be designated by a manufacturer of the one or more ovens 106 and/or by preference of a user of the system 100. Also, the one or more regulations can be entered into the system 100 via the one or more input devices 108 and be stored in the memory 118 (e.g., the operations database 704) and/or in a cloud environment (e.g., via the one or more networks).

In response to determining that one or more baking information and/or one or more oven settings are in contradiction to one or more regulations regarding a subject oven 106, the maintenance component 702 can generate and send a warning to the one or more input devices 108 for a user to review. The warning can comprise information regarding the baking information and/or one or more oven settings, the subject oven 106, and/or the one or more regulations being violated.

Figure 8:
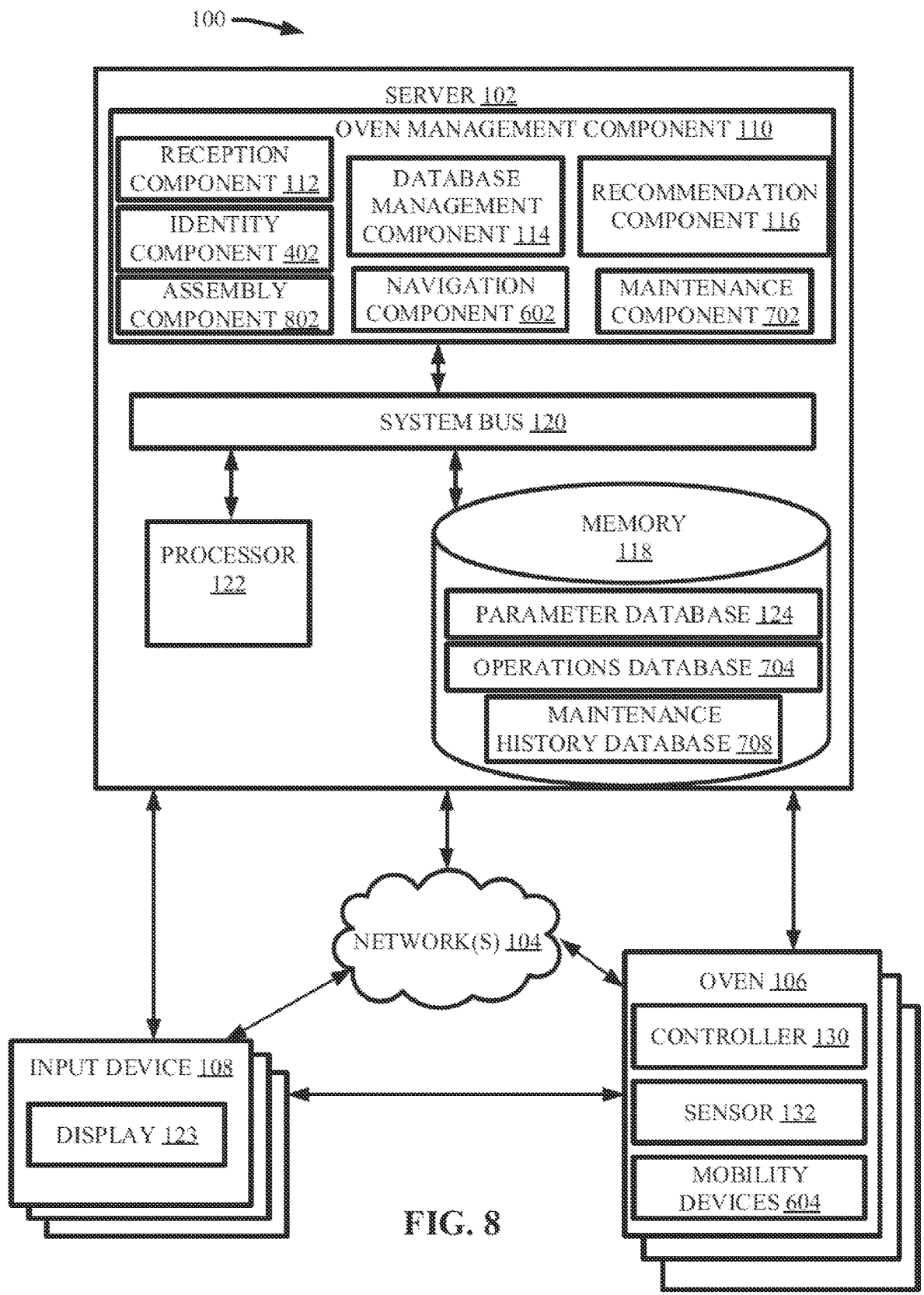
FIG. 8 illustrates a block diagram of an example, non-limiting oven system that can that can facilitate management of one or more smart ovens in accordance with one or more embodiments described herein.

FIG. 8 illustrates a block diagram of the example, non-limiting system 100 further comprising assembly component 802. Repetitive description of like elements employed in other embodiments described herein is omitted for sake of brevity. The assembly component 802 can facilitate a user of the system 100 to assemble one or more ovens 106.

In various embodiments, the assembly component 802 can generate and/or send one or more assembly instructions to one or more input devices 108. As used herein, the term "assembly instructions" can refer to one or more instructions regarding the assembly, repair, and/or configuration of one or more ovens 106 and/or one or more systems 100. The assembly instructions can be presented to a user via one or more input devices 108 visually (e.g., through one or more images, videos, and/or texts) and/or audibly (e.g., through audible expression of a language and/or noise prompts). Additionally, the assembly component 802 can generate and/or send an assembly instruction in response to a question, comment, and/or answer supplied to the system 100 via one or more input devices 108.

In various embodiments, a user of the system 100 can submit an assembly request to start an assembly, repair, and/or configuration to the assembly component 802 (e.g., via the one or more networks and/or the reception component 112). In response to receiving the assembly request, the assembly component 802 can prompt the user (e.g., via the one or more input devices 108) to select one or more assembly instructions related to the assembly request. The assembly instructions can be associated with one or more tutorials stored in the memory 118 and/or a cloud environment (e.g., via the one or more networks 104). Upon receiving an assembly instruction selection, the assembly component 802 can send one or more assembly instructions to the input device 108 for the user to review. The assembly instructions can be presented in various formats, including, but not limited to: video, audio, still image, motion picture, text, two dimensional projection, three dimensional projection, a combination thereof, and/or the like.

In one or more embodiments, the assembly instructions can be stored a plurality of parts, wherein the assembly component 802 can send a part of the subject assembly instructions in response to completion of a previous sent part of the assembly instructions. For example, the assembly component 802 can send a part of the assembly instructions to the input device 108 in response to confirming that a user of the system 100 has completed a task described by a previously sent part of the subject assembly instructions. In various embodiments, a user of the system 100 can confirm completion of a task via the one or more input devices 108. In one or more embodiments, confirmation that a task has been completed can be conducted and/or facilitated by the one or more sensors 132. For example, a task can comprise installing the one or more sensors 132 in a subject oven 106, whereupon completing the installation the one or more sensors 132 can send information (e.g., baking information and/or maintenance information) to one or more servers 102. The assembly component 802 can associate the server's 102 receiving of said information as a confirmation that the subject sensors 132 have been installed and generate and/or send the next part of the subject assembly instructions to the one or more input devices 108.

In another example, one or more sensors 132 can monitor the presence and/or status of one or more oven 106 components, wherein information (e.g., maintenance information) collected by the sensors 132 can serve as confirmation that a component has been installed in accordance with one or more tasks described by a part of the subject assembly instructions. For instance, the sensors 132 can comprise one or more lasers that can detect the presence, or lack thereof, of a component within the path of a laser beam. The assembly component 802 can associate the presence of the component with completion of a task. In another instance, the sensors 132 can comprise one or more cameras that can capture video and/or images of the oven 106 during the subject assembly and send said video and/or images to the assembly component 802 (e.g., via the one or more networks 104 and/or reception component 112). The assembly component 802 can analyze the received video and/or images with machine learning technologies to identify one or more oven 106 components and associate the identification of one or more oven 106 components with completion of a task.

In various embodiments, the assembly component 802 can also generate a response to one or more questions, comments, and/or commands submitted by a user of the system 100 via one or more input devices 108. The questions, comments, and/or commands can be entered into one or more input devices 108 via text (e.g., through a keyboard) and/or audibly (e.g., through a microphone). The questions, comments, and/or commands can be sent to the assembly component 802 by the input device 108 via the one or more networks 104 and/or reception component 112. The assembly component 802 can analyze the questions, comments, and/or commands with artificial intelligence technologies (e.g., neural networks) to determine the subject matter conveyed by the questions, comments, and/or commands. The assembly component 802 can also generate one or more responses to the questions, comments, and/or commands regarding the determined subject matter. The response can comprise: an affirmative or negative reply (e.g., a "yes" or a "no"), a pre-composed reply stored in the memory 118 and/or a cloud environment (e.g. via the one or more networks 104), a part of the assembly instructions, a combination thereof, and/or the like. The response can be conveyed to a user of the system 100 via the one or more input devices 108 in various formats, including, but not limited to: a video, a picture, an image projection, an audio signal, text, a combination thereof, and/or the like. In various embodiments, the assembly component 802 can utilize artificial intelligence technologies (e.g., machine learning, neural networking, and/or clustering) to analyze received questions, comments, and/or commands and/or generate one or more responses.

In one or more embodiments, the assembly component 802 can consider one or more extrinsic factors in sending the assembly instructions and/or generating the one or more responses. Example extrinsic factors can include, but are not limited to: location of a subject oven 106, authorization credentials of a user of the system 100, oven 106 features associated with the sale or lease agreement associated with the subject oven 106, a combination thereof, and/or the like. For instance, a subject oven 106 can be capable performing one or more features that remain locked and/or unavailable to one or more users of the system 100. Thus, the assembly component 802 can be configured to send only assembly instructions regarding features accessible to the user based on the user's authorization credentials and/or the terms and conditions of a subject sale or lease agreement regarding the oven 106. The authorization credentials and/or the terms and conditions of a subject sale or lease agreement can be entered into the system 100 via the one or more input devices 108 and can be stored in the memory 118 and or a cloud environment (e.g., via the one or more networks 104).

Figure 9:
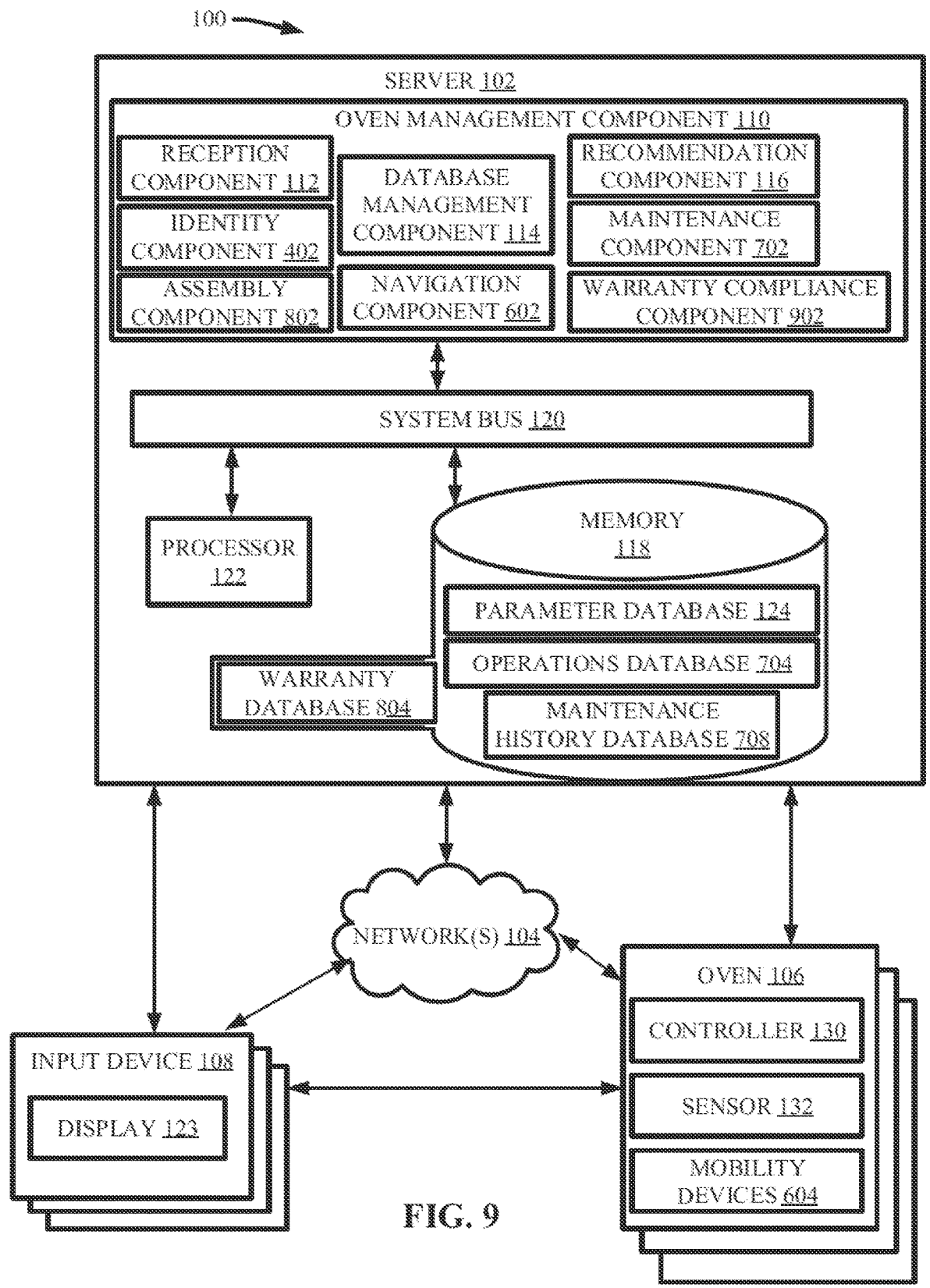
FIG. 9 illustrates a block diagram of an example, non-limiting oven system that can that can facilitate management of one or more smart ovens in accordance with one or more embodiments described herein.

FIG. 9 illustrates a block diagram of the example, non-limiting system 100 further comprising warranty compliance component 902. Repetitive description of like elements employed in other embodiments described herein is omitted for sake of brevity. The warranty compliance component 902 can monitor use of an oven 106 and notify one or more parties when said use violates one or more terms of a warranty regarding the oven 106.

In various embodiments, the warranty compliance component 902 can compare one or more oven settings (e.g., as configured by the one or more controllers 130) and/or information regarding the oven (e.g., information in the parameter database 124, the operations database 704, and/or the maintenance history database 708) with one or more terms and/or conditions stored in a warranty database 904. The warranty database 904 can comprise one or more terms and/or conditions regarding one or more respective ovens 106. Example term and conditions, can include, but are not limited to: the duration of a subject warranty for a subject oven 106, acceptable operating parameters of a subject oven 106 in accordance with a subject warranty (e.g., acceptable operating temperature ranges, acceptable operating pressures, acceptable operating cook times, a combination thereof, and/or the like), acceptable item parameters of one or more items to be baked by a subject oven 106 in accordance with a subject warranty, a combination thereof, and/or the like. The warranty database 904 can be stored in the memory 118 and/or a cloud environment (e.g., via the one or more networks 104). The warranty database 904 can be entered into the system 100 via the one or more input devices 108 and/or be inputted into the system 100 from a cloud environment (e.g., via the one or more networks 104).

In response to a controller 130 configuring one or more settings of an oven 106 (e.g., a temperature setting), the warranty compliance component 902 can compare the one or more settings to information stored in the warranty database 904. In response to determining that the one or more settings are not within ranges and/or values depicted by the information in the warranty database 904, the warranty compliance component 902 can generate one or more notifications and send said notifications to one or more parties. The one or more notifications can comprise information regarding the subject oven settings, information regarding a subject warranty, the one or more terms and/or conditions stored in the warranty database 904 that are being violated by the subject oven settings, a combination thereof, and/or the like. The one or more notifications can be sent to one or more input devices 108 for one or more users of the system 100 to review (e.g., an operator of the oven 106 and/or a provider of the subject warranty). Thus, when an oven 106 is being configured to settings that will result in operating condition which violate the oven's 106 warranty, an operator of the oven 106 can be notified by the warranty compliance component 902 that said settings violate the terms and/or conditions of the oven's 106 warranty, wherein the operator can choose to alter the settings to comply with the warranty. Also, when an oven 106 is being configured to settings that will result in operating condition which violate the oven's 106 warranty, an entity offering the warranty can be notified by the warranty compliance component 902 that one or more terms and/or conditions of the warranty have been or are about to be violated.

Figure 10:
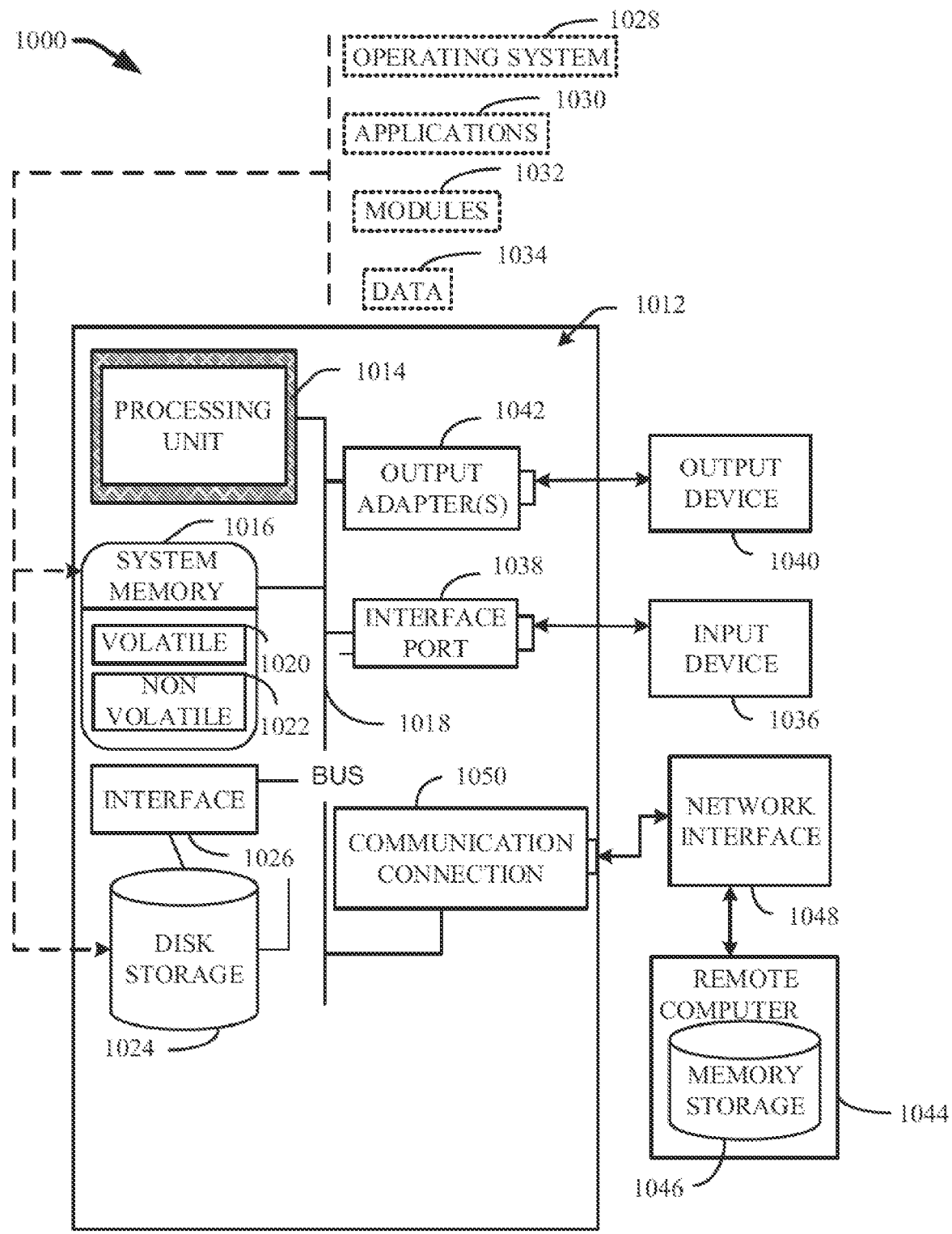
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An oven system, comprising:
   a memory that stores computer executable components;
   a processor, operably coupled to the memory, and that executes the computer executable components stored in the memory, wherein the computer executable components comprise:
   a warranty compliance component that monitors an operating condition of an oven during operation and determines whether the operating condition is within a value range defined by a warranty regarding the oven, wherein the warranty regarding the oven includes a maintenance history database, wherein the maintenance history database includes the value range of a routine maintenance inspection, wherein in response to determining that the operating condition is not within the value range of the routine maintenance inspection, the warranty compliance component generates a notification regarding the operating condition and the value range of the routine maintenance inspection, and
   a controller that suspends operation of the oven in response to the notification.

2. The oven system of claim 1, wherein the warranty component determines whether the operating condition is within the value range in response to configuration of a setting by the controller.

3. The oven system of claim 1, wherein the warranty compliance component sends the notification to a device associated with an operator of the oven.

4. The oven system of claim 1, wherein the warranty compliance component sends the notification to a device associated with an entity offering the warranty.

5. The oven system of claim 1, wherein the operating condition is selected from a group consisting of: a temperature inside the oven, a humidity inside the oven, and a variation in temperature during a bake.

6. An oven system, comprising:
   a memory that stores computer executable components;
   a processor, operably coupled to the memory, and that executes the computer executable components stored in the memory, wherein the computer executable components comprise:
   a warranty component that compares an operating condition during operation of the oven with conditions stored in a warranty database and determines, wherein the warranty database includes a maintenance history database, wherein the maintenance history database includes the conditions of a routine maintenance inspection, based on the comparison, whether the operating condition complies with the conditions of the routine maintenance inspection, and wherein, in response to determining that the operating condition does not comply with the conditions of the routine maintenance inspection, the warranty component generates a notification regarding the conditions of the routine maintenance inspection, and a controller that suspends operation of the oven in response to the notification.

7. The oven system of claim 6, wherein the warranty component compares the operating condition with the conditions stored in the warranty database in response to configuration of an oven setting by the controller.

8. The oven system of claim 6, wherein the warranty component sends the notification to a device associated with an operator of the oven.

9. The oven system of claim 6, wherein the warranty component sends the notification to a device associated with an entity offering a warranty associated with the conditions.

10. The oven system of claim 6, wherein the operating condition is selected from a group consisting of: a temperature inside the oven, a humidity inside the oven, and a variation in temperature during a bake.

* * * * *